(12) United States Patent
Kubota et al.

(10) Patent No.: US 11,150,443 B2
(45) Date of Patent: Oct. 19, 2021

(54) IMAGING LENS

(71) Applicant: TOKYO VISIONARY OPTICS CO., LTD., Tokyo (JP)

(72) Inventors: Yoji Kubota, Nagano (JP); Kenichi Kubota, Tochigi (JP); Hitoshi Hirano, Tochigi (JP); Tomohiro Yonezawa, Tochigi (JP)

(73) Assignee: TOKYO VISIONARY OPTICS CO., LTD., Tokyo (JP)

( * ) Notice: Subject to any disclaimer, the term of this patent is extended or adjusted under 35 U.S.C. 154(b) by 86 days.

(21) Appl. No.: 16/574,284

(22) Filed: Sep. 18, 2019

(65) Prior Publication Data

US 2020/0012076 A1  Jan. 9, 2020

Related U.S. Application Data

(63) Continuation of application No. 15/900,973, filed on Feb. 21, 2018, now Pat. No. 10,520,702, which is a continuation of application No. 15/275,557, filed on Sep. 26, 2016, now Pat. No. 9,933,597, which is a continuation of application No. 14/572,832, filed on Dec. 17, 2014, now Pat. No. 9,541,730.

(30) Foreign Application Priority Data

Mar. 20, 2014 (JP) ................. 2014-057414

(51) Int. Cl.
*G02B 9/64* (2006.01)
*G02B 9/12* (2006.01)
*G02B 13/00* (2006.01)
*G02B 27/00* (2006.01)

(52) U.S. Cl.
CPC ............ *G02B 9/64* (2013.01); *G02B 9/12* (2013.01); *G02B 13/0045* (2013.01); *G02B 27/0025* (2013.01)

(58) Field of Classification Search
None
See application file for complete search history.

(56) References Cited

U.S. PATENT DOCUMENTS

| 8,599,495 | B1 | 12/2013 | Tsai |
| 9,063,318 | B2 | 6/2015 | Ishizaka |
| 9,164,261 | B2 | 10/2015 | Ono |
| 2012/0194920 | A1 | 8/2012 | Huang |
| 2014/0043694 | A1* | 2/2014 | Tsai ................ G02B 27/0025 359/708 |

(Continued)

FOREIGN PATENT DOCUMENTS

JP  2012-155223 A  8/2012

*Primary Examiner* — Darryl J Collins
(74) *Attorney, Agent, or Firm* — Hamre, Schumann, Mueller & Larson, P.C.

(57) ABSTRACT

An imaging lens includes a stop; a first lens having positive refractive power; a second lens having negative refractive power; a third lens; a fourth lens having positive refractive power; a fifth lens; a sixth lens; and a seventh lens, arranged in this order from an object side to an image plane side. The first lens is formed in a meniscus shape near an optical axis thereof. The third lens is formed in a shape so that a surface thereof directing to the image plane side is concave near an optical axis thereof. The sixth lens is formed in a meniscus shape near an optical axis thereof.

20 Claims, 18 Drawing Sheets

(56) References Cited

U.S. PATENT DOCUMENTS

2014/0139719 A1    5/2014    Fukaya
2014/0211324 A1    7/2014    Isizaka
2015/0070783 A1    3/2015    Hashimoto
2015/0198787 A1    7/2015    Kubota et al.
2015/0198791 A1    7/2015    Kubota et al.
2015/0247990 A1    9/2015    Kubota et al.
2017/0254989 A1    9/2017    Tsai \* cited by examiner

IMAGING LENS

CROSS-REFERENCE TO RELATED APPLICATIONS

This is a continuation application of a prior application Ser. No. 15/900,973, filed on Feb. 21, 2018, pending, which is a continuation application of a prior application Ser. No. 15/275,557, filed on Sep. 26, 2016, issued on Apr. 3, 2018 as U.S. Pat. No. 9,933,957, which is a continuation application of a prior application Ser. No. 14/572,832, issued on Jan. 10, 2017 as U.S. Pat. No. 9,541,730.

BACKGROUND OF THE INVENTION AND RELATED ART STATEMENT

The present invention relates to an imaging lens for forming an image of an object on an imaging element such as a CCD sensor and a CMOS sensor. Particularly, the present invention relates to an imaging lens suitable for mounting in a relatively small camera such as a camera to be built in a portable device including a cellular phone and a portable information terminal, a digital still camera, a security camera, a vehicle onboard camera, and a network camera.

In these years, in place of cellular phones that are intended mainly for making phone calls, so-called smartphones have been more widely used, i.e., cellular phones with such functions as those of portable information terminals (PDA) and/or personal computers. Since the smartphones generally are highly functional as opposed to the cellular phones, it is possible to use images taken by a camera thereof in various applications.

Generally speaking, product groups of cellular phones and smartphones often include various designs from the ones for beginners to the ones for advanced users. Among them, an imaging lens to be mounted in a product, which is developed for advanced users, is required to have a high resolution lens configuration so as to be also applicable to a high pixel count imaging element of these days.

In order to achieve a high resolution imaging lens, there is a method of increasing the number of lenses that compose the imaging lens. However, increase of the number of lenses easily causes increase in the size of the imaging lens, so that it is not preferred for the imaging lens to be mounted in a small-sized camera, such as the ones of cellular phones and smartphones. For this reason, the imaging lens has been conventionally developed in view of restraining the number of lenses as small as possible.

In recent years, a technology for increasing a pixel count of an imaging element has been dramatically advanced. A main focus in developing the imaging lens has been changing to achieving a lens configuration having high resolution, rather than shortening a total track length. For example, there has been available a camera unit capable of obtaining a quality image even in comparison with that taken by a digital still camera by attaching the camera unit to a cellular phone, a smartphone, or the like, instead of mounting the camera unit that includes an imaging lens and an imaging element in a cellular phone, a smartphone, or the like, which is conventionally done.

Although a seven-lens configuration could be slightly disadvantageous in view of downsizing the imaging lens due to the large number of lenses that compose the imaging lens, there is high flexibility in designing. Therefore, the seven-lens configuration may have potential to achieve satisfactory correction of aberrations and downsizing of the imaging lens in a balanced manner. As the imaging lens having such a seven-lens configuration, for example, there is known one that is described in Patent Reference.

Patent Reference: Japanese Patent Application Publication No. 2012-155223

According to Patent Reference, the conventional imaging lens includes a first lens having a biconvex shape; a second lens that is joined to the first lends and has a biconcave shape; a third lens that is negative and has a shape of a meniscus lens directing a convex surface thereof to the object side; a fourth lens that is positive and has a shape of a meniscus lens directing a concave surface thereof to the object side; a fifth lens that is negative and has a convex surface directing to the object side; a sixth lens having a biconvex shape; and a seventh lens having a biconcave shape, arranged in the order from the object side. According to the conventional imaging lens disclosed in Patent Reference, through restraining a ratio between a focal length of a first lens group composed of the lenses from the first lens to the fourth lens and a focal length of a second lens group composed of the lenses from the fifth lens to the seventh lens within a certain range, it is possible to attain downsizing of the imaging lens and satisfactory correction of aberrations.

According to the conventional imaging lens disclosed in Patent Reference, although the size of the imaging lens is small, correction of an image surface is not sufficient and especially distortion is relatively large. Therefore, there is a limit by itself in achieving a high-resolution imaging lens. According to the lens configuration of the conventional imaging lens described in Patent Reference, it is difficult to more satisfactorily correct aberrations while downsizing the imaging lens.

Here, the above-described problem is not only specific to the imaging lens to be mounted in cellular phones and smart phones. Rather, it is a common problem even for an imaging lens to be mounted in a relatively small camera such as digital still cameras, portable information terminals, security cameras, vehicle onboard cameras, and network cameras.

In view of the above-described problems in conventional techniques, an object of the present invention is to provide an imaging lens that can attain both downsizing and satisfactory correction of aberrations.

Further objects and advantages of the invention will be apparent from the following description of the invention.

SUMMARY OF THE INVENTION

In order to attain the objects described above, according to a first aspect of the present invention, an imaging lens includes a first lens group having positive refractive power; a second lens group having positive refractive power; and a third lens group having negative refractive power, arranged in the order from an object side to an image plane side. The first lens group includes a first lens having positive refractive power; a second lens having negative refractive power; and a third lens having negative refractive power. The second lens group includes a fourth lens and a fifth lens. The third lens group includes a sixth lens and a seven lens.

According to the first aspect of the invention, when the first lens has Abbe's number vd1, the second lens has Abbe's number vd2, and the third lens has Abbe's number vd3, the imaging lens satisfies the following conditional expressions (1) to (3)

$$40 < vd1 < 75 \tag{1}$$

$$20 < vd2 < 35 \tag{2}$$

$$20 < vd3 < 35 \tag{3}$$

As described above, according to the first aspect of the invention, the imaging lens includes the first lens group having positive refractive power, the second lens group having positive refractive power similarly to the first lens group, and the third lens group having negative refractive power, arranged in the order from the object side. The refractive powers of the respective lens groups are arranged as "positive-positive-negative" from the object side. Typically, a chromatic aberration is corrected by disposing a lens group having positive refractive power and a lens group having negative refractive power in the order from the object side. In case of the lens configuration like this, in order to downsize the imaging lens, it is necessary to increase the refractive power of the lens group that has positive refractive power and is disposed on the object side. However, when the refractive power of the lens group having positive refractive power is strong, it is often difficult to satisfactorily correct a chromatic aberration.

According to the first aspect of the invention, in the imaging lens, the positive refractive power of the whole lens system is divided between the first lens group and the second lens group. Therefore, in comparison with when only one lens group has positive refractive power, it is possible to relatively weakly retain the refractive power of the positive lenses that compose the respective lens groups. Therefore, according to the imaging lens of the invention, among aberrations, it is especially possible to satisfactorily correct the chromatic aberration. Moreover, it is achievable to obtain satisfactory image-forming performance that is necessary for high-resolution imaging lens. Furthermore, according to the imaging lens of the invention, the third lens group has negative refractive power, so that it is possible to suitably achieve downsizing of the imaging lens.

As described above, according to the first aspect of the invention, the first lens group includes three lenses, such that the arrangement of refractive powers thereof is positive-negative-negative. Those three lenses are made of lens materials that satisfy the conditional expressions (1) to (3). As a result, lens materials of the first lens, the second lens, and the third lens are a combination of a low-dispersion material and high-dispersion materials. With such arrangement of the refractive powers and the order of Abbe's numbers of the respective lenses, it is achievable to suitably restrain generation of the chromatic aberration in the first lens group, and satisfactorily correct the chromatic aberration if generated. Here, according to the imaging lens of the invention, the negative refractive power is shared between two lenses, i.e., the second lens and the third lens, so that individual refractive powers of the second lens and the third lens are relatively weak. Since aberrations are corrected stepwise by the two lenses having relatively weak refractive powers, it is possible to more satisfactorily correct the chromatic aberration than a lens configuration in which one negative lens is disposed on a side of an image surface of the first lens.

According to a second aspect of the invention, when the fourth lens has positive refractive power, the fifth lens has negative refractive power, the fourth lens has Abbe's number $vd4$ and the fifth lens has Abbe's number $vd5$, the imaging lens having the above-described configuration preferably satisfies the following conditional expressions (4) and (5):

$$40<vd4<75 \quad (4)$$

$$20<vd5<35 \quad (5)$$

According to the second aspect of the invention, the second lens group is composed of two lenses that are a positive lens and a negative lens. In addition, the second lens group is composed of a combination of a lens made of a low-dispersion material and a lens made of a high-dispersion material so as to satisfy the conditional expressions (4) and (5). As a result, among the aberrations generated in the first lens group, especially the chromatic aberration is more satisfactorily corrected. In general, in order to achieve a high-resolution imaging lens, among aberrations, it is necessary to satisfactorily correct especially a chromatic aberration. According to the imaging lens of the invention, the arrangement of the refractive powers of the respective lens groups, the first to the third lens groups, and the arrangement of the refractive powers and the order of Abbe's numbers of the three lenses that compose the first lens group, and the arrangement of the refractive powers and the order of Abbe's numbers of the two lenses that compose the second lens group, it is achievable to more satisfactorily correct the chromatic aberration than a conventional imaging lens.

According to the imaging lens having the above-described configuration, the seventh lens is preferably formed, so as to have a negative refractive power and so as to be formed in a shape such that the positive refractive power increases as it goes to a lens periphery.

According to such shape of the seventh lens, it is achievable to satisfactorily correct not only an axial chromatic aberration, but also an off-axis chromatic aberration of magnification. Moreover, as is well known, in case of an imaging element such as a CCD sensor and a CMOS sensor, there is set in advance a range of an incident angle of a light beam that can be taken in a sensor (so-called "chief ray angle (CRA)"). With a lens shape like that of the above-described seventh lens, it is achievable to suitably restrain the incident angle of a light beam emitted from the imaging lens to the image plane within the range of CRA. As a result, it is achievable to suitably restrain generation of shading, which is a phenomenon of becoming dark on the image periphery.

According to a third aspect of the invention, when the first lens has a focal length $f1$, and a composite focal length of the second lens and the third lens is $f23$, the imaging lens having the above-described configuration preferably satisfies the following conditional expression (6):

$$-4.0<f23/f1<-1.5 \quad (6)$$

When the imaging lens satisfies the conditional expression (6), it is achievable to restrain astigmatism, a field curvature, and a chromatic aberration within satisfactory ranges in a balanced manner, while downsizing the imaging lens. When the value exceeds the upper limit of "−1.5", the negative refractive powers of the second lens and the third lens are relatively strong than the positive refractive power of the first lens. Therefore, it is advantageous for correction of the chromatic aberration. On the other hand, since the back focal length is long, it is difficult to downsize the imaging lens. Moreover, in the astigmatism, a sagittal image surface and a tangential image surface both tilt to the side of the image plane (in a plus direction). As a result, it is difficult to correct the astigmatism and the field curvature increases, and therefore it is difficult to obtain satisfactory image-forming performance. On the other hand, when the value is below the lower limit of "−4.0", although it is advantageous for downsizing of the imaging lens, the back focal length is short. As a result, it is difficult to secure a space for disposing an insert such as an infrared cutoff filter. In addition, the image-forming surface curves to the object side and the field curvature increases. Therefore, it is difficult to obtain satisfactory image-forming performance.

According to a fourth aspect of the invention, when the second lens has a focal length f2, and a third lens has a focal length f3, the imaging lens having the above-described configuration preferably satisfies the following conditional expression (7):

$$0.1 < f2/f3 < 0.6 \qquad (7)$$

When the imaging lens satisfies the conditional expression (7), it is achievable to satisfactorily correct the astigmatism and the field curvature. When the value exceeds the upper limit of "0.6", in the first lens group, the negative refractive power of the second lens, which is close to the first lens that is positive, is relatively weak. Therefore, in the astigmatism, the tangential image surface curves to the object side (in a minus direction), and an astigmatic difference increases. As a result, it is difficult to correct the astigmatism. Moreover, since the image-forming surface curves in a minus direction, it is difficult to obtain satisfactory image-forming performance. On the other hand, when the value is below the lower limit of "0.1", in the astigmatism, the tangential image surface curves in a plus direction, and the astigmatic difference increases. As a result, it is difficult to correct the astigmatism. In addition, the image-forming surface curves in the plus direction, also in this case, it is difficult to obtain satisfactory image-forming performance.

According to a fifth aspect of the invention, when the whole lens system has a focal length f and the first lens has a focal length f1, the imaging lens having the above-described configuration preferably satisfies the following conditional expression (8):

$$0.5 < f1/f < 2.0 \qquad (8)$$

When the imaging lens satisfies the conditional expression (8), it is achievable to satisfactorily correct the astigmatism, the field curvature, and the distortion, while downsizing the imaging lens. In addition, when the imaging lens satisfies the conditional expression (8), it is also achievable to restrain the incident angle of a light beam emitted from the imaging lens to the image plane within the range of CRA. When the value exceeds the upper value of "2.0", the positive refractive power of the first lens is weak relative to the refractive power of the whole lens system. As a result, the positive refractive power of the second lens group is relatively strong. For this reason, it is easy to restrain the incident angle of a light beam emitted from the imaging lens to the image plane within the range of CRA. But in the astigmatism, the sagittal image surface curves in a minus direction and the field curvature is insufficiently corrected (an image-forming surface curves in a minus direction). Therefore, it is difficult to obtain satisfactory image-forming performance. On the other hand, when the value is below the lower limit of "0.5", although it is advantageous for downsizing of the imaging lens, it is difficult to secure the back focal length. In addition, it is difficult to restrain the incident angle of a light beam emitted from the imaging lens to the image plane within the range of CRA. Furthermore, in this case, the plus distortion increases, so that it is difficult to obtain satisfactory image-forming performance.

According to a sixth aspect of the invention, when a composite focal length of the fourth lens and the fifth lens is f45 and a composite focal length of the sixth lens and the seventh lens is f67, the imaging lens having the above-described configuration preferably satisfies the following conditional expression (9):

$$-6.0 < f45/f67 < -1.5 \qquad (9)$$

When the imaging lens satisfies the conditional expression (9), it is achievable to restrain the distortion, the chromatic aberration, and the field curvature within their respective satisfactory ranges, while downsizing the imaging lens. When the value exceeds the upper limit of "−1.5", the negative refractive power of the third lens group is weak relative to the positive refractive power of the second lens group. Therefore, it is necessary to weaken the positive refractive power of the first lens group. When the refractive power of the first lens group is weak, it is easy to secure the back focal length, but it is difficult to downsize the imaging lens. Moreover, the minus distortion and the chromatic aberration of magnification increase, and the filed curvature is insufficiently corrected. Therefore, it is difficult to obtain satisfactory image-forming performance. On the other hand, when the value is below the lower limit of "−6.0", although it is advantageous for correction of the chromatic aberration and correction of the field curvature, a plus distortion increases. Therefore, it is difficult to obtain satisfactory image-forming performance.

According to a seventh aspect of the invention, when the whole lens system has a focal length f, and a composite focal length of the sixth lens and the seventh lens is f67, the imaging lens having the above-described configuration preferably satisfies the following conditional expression (10):

$$-1.7 < f67/f < -0.5 \qquad (10)$$

When the imaging lens satisfies the conditional expression (10), it is achievable to satisfactorily correct the distortion, the chromatic aberration, and the astigmatism in a balanced manner, while restraining the incident angle of a light beam emitted from the imaging lens to the image plane within the range of CRA. When the value exceeds the upper limit of "−0.5", the refractive power of the third lens group is strong relative to that of the whole lens system. For this reason, the chromatic aberration of magnification increases at image periphery and the plus distortion increases. As a result, it is difficult to obtain satisfactory image-forming performance. In addition, it is difficult to restrain the incident angle of a light beam emitted from the imaging lens to the image plane within the range of CRA. On the other hand, when the value is below the lower limit of "−1.7", although it is advantageous for correction of the distortion, in the astigmatism, the sagittal image surface curves to the object side and the chromatic aberration of magnification increases. Therefore, it is difficult to obtain satisfactory image-forming performance.

According to an eighth aspect of the invention, when the sixth lens has Abbe's number vd6 and the seventh lens has Abbe's number vd7, the imaging lens having the above-described configuration preferably satisfies the following conditional expressions (11) and (12):

$$40 < vd6 < 75 \qquad (11)$$

$$40 < vd7 < 75 \qquad (12)$$

The sixth lens and the seventh lens compose the third lens group, which is the lens group that is closest to the image plane side. When the sixth lens and the seventh lens are made of low-dispersion materials that satisfy the conditional expressions (11) and (12), it is achievable to suitably restrain the chromatic dispersion at the respective lenses and satisfactorily correct the aberrations.

According to a ninth aspect of the invention, when the fourth lens has positive refractive power, the whole lens system has a focal length f, and the fourth lens has a focal length f4, the imaging lens having the above-described configuration preferably satisfies the following conditional expression (13):

$$1.0 < f4/f < 3.0 \tag{13}$$

When the imaging lens satisfies the conditional expression (13), it is achievable to satisfactorily correct an off-axis coma aberration and the distortion, while downsizing the imaging lens. In addition, when the imaging lens satisfies the conditional expression (13), it is also possible to restrain the incident angle of a light beam emitted from the imaging lens to the image plane within the range of CRA. When the value exceeds the upper limit of "3.0", the positive refractive power of the fourth lens is weak relative to that of the refractive power of the whole lens system. Therefore, in order to satisfactorily correct the aberrations, it is necessary to relatively increase the positive refractive power of the first lens group. In this case, although it is advantageous for downsizing of the imaging lens, it is difficult to secure the back focal length. Furthermore, the plus distortion increases and an inner coma aberration easily occurs on a tangential surface of an off-axis beam of light. As a result, it is difficult to obtain satisfactory image-forming performance. On the other hand, when the value is below the lower limit of "1.0", although it is easy to restrain the incident angle of a light beam emitted from the imaging lens to the image plane within the range of CRA, it is difficult to downsize the imaging lens. In addition, a coma aberration easily occurs on a sagittal surface and on a tangential surface of an off-axis beam of light. Therefore, it is difficult to obtain satisfactory image-forming performance.

According to a tenth aspect of the invention, when the seventh lens has negative refractive power, the whole lens system has a focal length f, and the seventh lens has a focal length f7, the imaging lens having the above-described configuration preferably satisfies the following conditional expression (14):

$$-4.0 < f7/f < -0.8 \tag{14}$$

When the imaging lens satisfies the conditional expression (14), it is achievable to satisfactorily correct the chromatic aberration and the field curvature, while downsizing the imaging lens. In addition, when the imaging lens satisfies the conditional expression (14), it is also achievable to restrain the incident angle of a light beam emitted from the imaging lens to the image plane within the range of CRA. When the value exceeds the upper limit of "−0.8", although it is advantageous for correction of the chromatic aberration and downsizing of the imaging lens, the field curvature is excessively corrected (an image-forming surface curves in a plus direction). As a result, it is difficult to obtain satisfactory image-forming performance. In addition, it is also difficult to restrain the incident angle of a light beam emitted from the imaging lens to the image plane within the range of CRA. On the other hand, when the value is below the lower limit of "−4.0", although it is easy to restrain the incident angle of a light beam emitted from the imaging lens to the image plane within the range of CRA, it is difficult to downsize the imaging lens. In addition, the chromatic aberration of magnification increases at image periphery, and the field curvature is insufficiently corrected. As a result, it is difficult to obtain satisfactory image-forming performance.

According to an eleventh aspect of the invention, when the whole lens system has a focal length f, a distance on an optical axis between the second lens and the third lens is D23, the imaging lens having the above-describe configuration preferably satisfies the following conditional expression (15):

$$0.03 < D23/f < 0.2 \tag{15}$$

When the imaging lens satisfies the conditional expression (15), it is achievable to satisfactorily correct the field curvature, the distortion, and the chromatic aberration, while downsizing the imaging lens. When the value exceeds the upper limit of "0.2", although it is advantageous for downsizing of the imaging lens, it is difficult to secure the back focal length. In addition, the plus distortion increases, and the field curvature is excessively corrected. Moreover, the chromatic aberration of magnification increases at image periphery, and it is difficult to obtain satisfactory image-forming performance. On the other hand, when the value is below the lower limit of "0.03", although it is easy to secure the back focal length, the field curvature is insufficiently corrected, and the chromatic aberration of magnification increases. As a result, it is difficult to obtain satisfactory image-forming performance.

According to a twelfth aspect of the invention, when the whole lens system has a focal length f and a distance on the optical axis between the third lens and the fourth lens is D34, the imaging lens having the above-described configuration preferably satisfies the following conditional expression (16):

$$0.03 < D34/f < 0.2 \tag{16}$$

When the imaging lens satisfies the conditional expression (16), it is achievable to restrain the field curvature, the distortion, and the chromatic aberration of magnification within satisfactory ranges in a balanced manner. When the value exceeds the upper limit of "0.2", although it is easy to restrain the chromatic aberration of magnification generated at image periphery, the field curvature is insufficiently corrected and the plus distortion increases. As a result, it is difficult to obtain satisfactory image-forming performance. On the other hand, when the value is below the lower limit of "0.03", although it is easy to secure the back focal length, the field curvature is excessively corrected. As a result, it is difficult to obtain satisfactory image-forming performance.

According to the imaging lens of the invention, it is possible to provide a small-sized imaging lens, which is especially suitable for mounting in a small camera, while having high resolution with satisfactorily corrected aberrations.

DETAILED DESCRIPTION OF PREFERRED EMBODIMENTS

Hereunder, referring to the accompanying drawings, an embodiment of the present invention will be fully described.

FIGS. 1, 4, 7, 10, 13, and 16 are schematic sectional views of the imaging lenses in Numerical Data Examples 1 to 6 according to the embodiment, respectively. Since a basic lens configuration is the same among those Numerical Data Examples, the lens configuration of the embodiment will be described with reference to the illustrative sectional view of Numerical Data Example 1.

Figure 1:
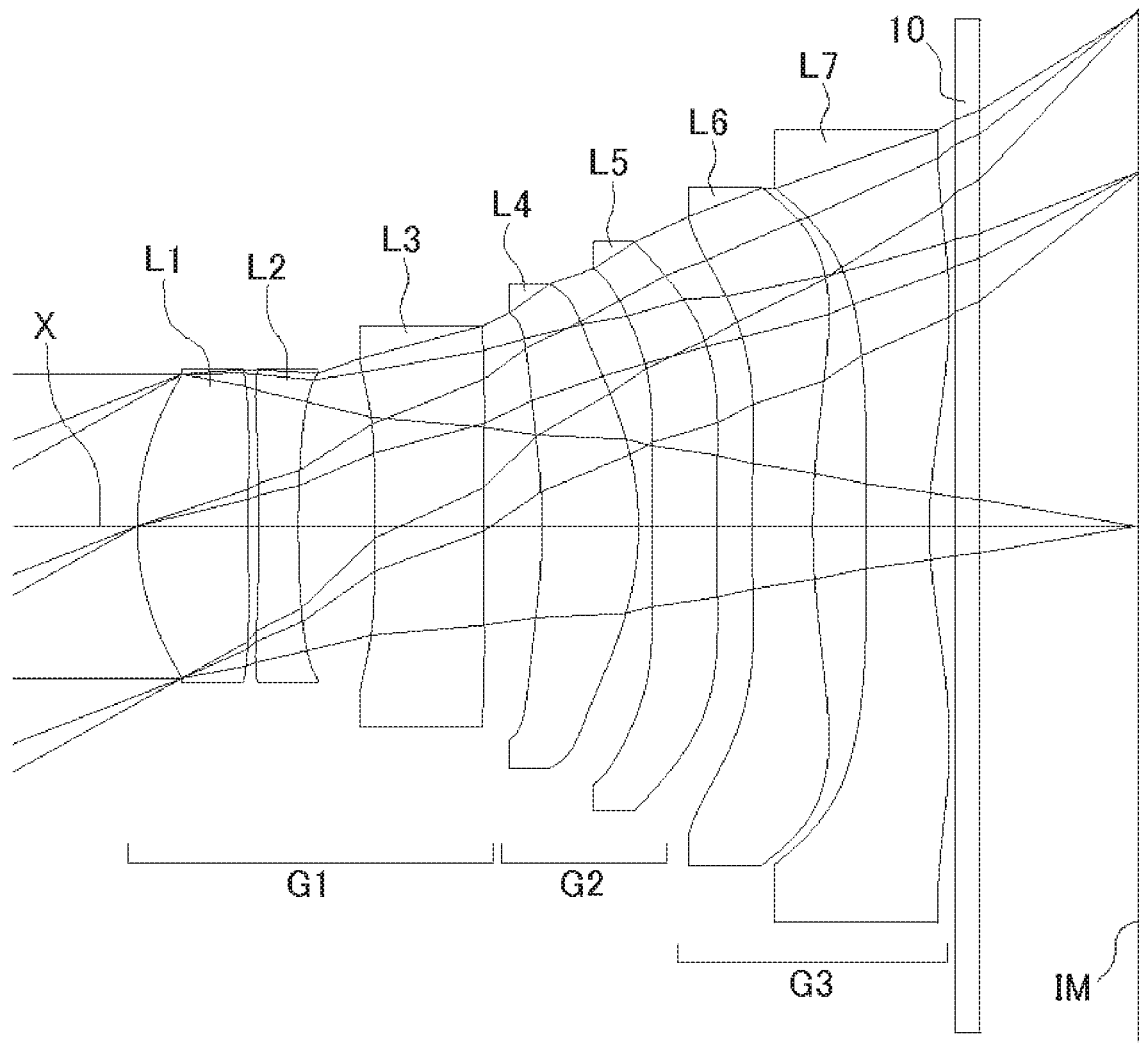
FIG. 1 shows a sectional view of a schematic configuration of an imaging lens in Numerical Data Example 1 according to an embodiment of the invention.

As shown in FIG. 1, the imaging lens of the embodiment includes a first lens group G1 having positive refractive power; a second lens group G2 having positive refractive power; and a third lens group G3 having negative refractive power, arranged in the order from an object side to an image plane side. Between the third lens group G3 and an image plane IM, there is disposed a filter 10. The filter 10 may be optionally omitted.

The first lens group G1 includes a first lens L1 having positive refractive power; a second lens L2 having negative refractive power; and a third lens L3 having negative refractive power, arranged in the order from the object side. The first lens L1 is formed in a shape such that a curvature radius r1 of an object-side surface thereof and a curvature radius r2 of an image plane-side surface thereof are both positive and so as to have a shape of a meniscus lens directing a convex surface thereof to the object side near an optical axis X. The shape of the first lens L1 is not limited to the one in Numerical Data Example 1. As an example of another shape of the first lens L1, Numerical Data Example 6 shows the one, which is formed in a shape such that the curvature radius r1 and the curvature radius r2 are both negative, i.e., a shape of a meniscus lens directing a concave surface thereof to the object side near the optical axis X. As another example, the first lens L1 may be formed in a shape such that the curvature radius r2 is negative, i.e., a shape of a biconvex lens near the optical axis X. Here, in order to more effectively downsize the imaging lens, the first lens L1 is preferably formed in a shape of a meniscus lens directing a convex surface thereof to the object side near the optical axis X.

The second lens L2 is formed in a shape such that a curvature radius r3 of an object-side surface is negative and a curvature radius r4 of an image plane-side surface is positive, and so as to have a shape of a biconcave lens near the optical axis X. Here, the shape of the second lens L2 is not limited to the one in Numerical Data Example 1. The shape of the second lens L2 may be any as long as the curvature radius r4 of the image plane-side surface thereof is positive, and can be formed in a shape such that the curvature radius r3 is positive, i.e., a shape of a meniscus lens directing a convex surface thereof to the object-side near the optical axis X. Numerical Data Examples 2 to 6 are examples, in which the shape of the second lens L2 is a meniscus lens directing a convex surface thereof to the object side near the optical axis X.

The third lens L3 is formed in a shape, such that a curvature radius r5 of the object-side surface thereof is negative and a curvature radius r6 of an image plane-side surface thereof is positive, and so as to have a shape of a biconcave lens near the optical axis X. The shape of the third lens L3 is also not limited to the one in Numerical Data Example 1. Numerical Data Example 3 is an example, in which the third lens L3 is formed in a shape such that the curvature radius r5 and the curvature radius r6 are both negative and has a shape of a meniscus lens directing a concave surface thereof to the object side near the optical axis X. Numerical Data Example 6 is an example, in which the third lens L3 is formed in a shape such that the curvature radius r5 and the curvature radius r6 are both positive and so as to have a shape of a meniscus lens directing a convex surface thereof to the object side near the optical axis X.

The second lens group G2 includes a fourth lens L4 having positive refractive power and a fifth lens L5 having negative refractive power, arranged in the order from the object side. Between them, the fourth lens L4 is formed in a shape such that a curvature radius r7 of an object-side surface thereof and a curvature radius r8 of an image plane-side surface thereof are both negative, and so as to have a shape of a meniscus lens directing a concave surface thereof to the object side near the optical axis X. The fourth lens L4 can be formed in any shapes as long as the refractive power is positive. As a shape of the fourth lens L4, for example, the fourth lens L4 can be formed in a shape such that the curvature radius r7 and the curvature radius r8 are both positive and so as to have a shape of a meniscus lens directing a convex surface thereof to the object side near the optical axis X. Numerical Data Example 6 is an example, in which the fourth lens L4 is formed in a shape of a meniscus lens directing a convex surface thereof to the object side near the optical axis X.

On the other hand, the fifth lens L5 is formed in a shape such that a curvature radius r9 of the object-side surface thereof and a curvature radius r10 of an image plane-side surface thereof are both positive and so as to have a shape of a meniscus lens directing a convex surface thereof to the object side near the optical axis X. The fifth lens L5 can have positive refractive power. Here, in view of satisfactory correction of aberrations, it is preferred that the refractive powers of the fourth lens L4 and the fifth lens L5 are not both positive/negative.

The third lens group G3 includes a sixth lens L6 having negative refractive power and a seventh lens L7 having negative refractive power, arranged in the order from the object side. The sixth lens L6 is formed in a shape such that a curvature radius r11 of an object-side surface thereof and a curvature radius r12 of an image plane-side surface thereof are both positive, and so as to have a shape of a meniscus lens directing a convex surface thereof to the object side near the optical axis X. The seventh lens L7 is formed in a shape such that a curvature radius r13 of an object-side surface thereof and a curvature radius r14 of an image plane-side surface thereof are both positive, and so as to have a shape of a meniscus lens directing a convex surface thereof to the object side near the optical axis X. Here, the refractive power of the sixth lens L6 can be positive. Numerical Data Example 2 is an example, in which the refractive power of the sixth lens L6 is positive.

In the sixth lens L6 and the seventh lens L7, the object-side surfaces thereof and the image-plane-side surfaces thereof are formed as aspheric surfaces having inflexion points, and so as to have strong positive refractive powers as it goes to the lens periphery. With those shapes of the sixth lens L6 and the seventh lens L7, it is achievable to satisfactorily correct not only an axial chromatic aberration, but also an off-axis chromatic aberration of magnification. In addition, it is also achievable to suitably restrain an incident angle of a light beam emitted from the imaging lens to the image plane IM within the range of a chief ray angle (CRA).

Here, according to the imaging lens of Numerical Data Example 1, the sixth lens L6 and the seventh lens L7 have their both object-side surfaces and image plane-side surfaces formed as aspheric shapes having inflexion points, but it is not necessary to form those both surfaces as aspheric surfaces having inflexion points. Even when only one of the surfaces is formed as an aspheric surface having an inflexion point, it is still possible to form both or one of the lenses in a shape so as to have strong positive refractive power as it goes to the lens periphery. In addition, depending on the levels of required optical performance and downsizing, it is not always necessary to provide an inflexion point on the sixth lens L6 and the seventh lens L7.

The imaging lens of the embodiment satisfies the following conditional expressions (1) to (16):

$$40 < vd1 < 75 \quad (1)$$

$$20 < vd2 < 35 \quad (2)$$

$$20 < vd3 < 35 \quad (3)$$

$$40 < vd4 < 75 \quad (4)$$

$$20 < vd5 < 35 \quad (5)$$

$$-4.0 < f23/f1 < -1.5 \quad (6)$$

$$0.1 < f2/f3 < 0.6 \quad (7)$$

$$0.5 < f1/f < 2.0 \quad (8)$$

$$-6.0 < f45/f67 < -1.5 \quad (9)$$

$$-1.7 < f67/f < -0.5 \quad (10)$$

$$40 < vd6 < 75 \quad (11)$$

$$40 < vd7 < 75 \quad (12)$$

$$1.0 < f4/f < 3.0 \quad (13)$$

$$-4.0 < f7/f < -0.8 \quad (14)$$

$$0.03 < D23/f < 0.2 \quad (15)$$

$$0.03 < D34/f < 0.2 \quad (16)$$

In the above conditional expressions:
vd1: Abbe's number of a first lens L1
vd2: Abbe's number of a second lens L2
vd3: Abbe's number of a third lens L3
vd4: Abbe's number of a fourth lens L4
vd5: Abbe's number of a fifth lens L5
vd6: Abbe's number of a sixth lens L6
vd7: Abbe's number of a seventh lens L7
f: Focal length of a whole lens system
f1: Focal length of the first lens L1
f2: Focal length of the second lens L2
f3: Focal length of the third lens L3
f4: Focal length of the fourth lens L4
f7: Focal length of the seventh lens L5
f23: Composite focal length of the second lens L2 and the third lens L3
f45: Composite focal length of the fourth lens L4 and the fifth lens L5
f67: Composite focal length of the sixth lens L6 and the seventh lens L7
D23: Distance on the optical axis between the second lens L2 and the third lens L3
D34: Distance on the optical axis between the third lens L3 and the fourth lens L4

Here, it is not necessary to satisfy all of the conditional expressions, and it is achievable to obtain an effect corresponding to the respective conditional expression when any single one of the conditional expressions is individually satisfied.

In the embodiment, all lens surfaces of the respective lenses are formed as an aspheric surface. When the aspheric surfaces applied to the lens surfaces have an axis Z in a direction of the optical axis X, a height H in a direction perpendicular to the optical axis, a conical coefficient k, and aspheric coefficients $A_4$, $A_6$, $A_8$, $A_{10}$, $A_{12}$, $A_{14}$, and $A_{16}$, a shape of the aspheric surfaces of the lens surfaces is expressed as follows:

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} \quad \text{[Formula 1]}$$

Next, Numerical Data Examples of the imaging lens of the embodiment will be described. In each Numerical Data Example, f represents a focal length of the whole lens system, Fno represents an F number, and ω represents a half angle of view, respectively. In addition, i represents a surface number counted from the object side, r represents a curvature radius, d represents a distance between lens surfaces (surface spacing) on the optical axis, nd represents a refractive index, and vd represents Abbe's number, respectively. Here, aspheric surfaces are indicated with surface numbers i affixed with * (asterisk).

Numerical Data Example 1

Basic data are shown below.

f=7.18 mm, Fno=3.0, ω=29.1°

Unit: mm

Surface Data

| Surface Number i | r | d | nd | vd |
|---|---|---|---|---|
| (Object) | ∞ | ∞ | | |
| 1* (Stop) | 2.137 | 0.876 | 1.5346 | 56.1 (=vd1) |
| 2* | 12.503 | 0.082 | | |
| 3* | −525.874 | 0.315 | 1.6355 | 24.0 (=vd2) |
| 4* | 8.206 | 0.602 (=D23) | | |
| 5* | −116.694 | 0.856 | 1.6355 | 24.0 (=vd3) |
| 6* | 19.254 | 0.464 (=D34) | | |
| 7* | −4.712 | 0.762 | 1.5346 | 56.1 (=vd4) |
| 8* | −2.361 | 0.105 | | |
| 9* | 17.655 | 0.510 | 1.6355 | 24.0 (=vd5) |
| 10* | 13.764 | 0.279 | | |
| 11* | 12.387 | 0.483 | 1.5346 | 56.1 (=vd6) |
| 12* | 6.010 | 0.418 | | |
| 13* | 33.769 | 0.500 | 1.5346 | 56.1 (=vd7) |
| 14* | 3.536 | 0.200 | | |
| 15 | ∞ | 0.200 | 1.5168 | 64.2 |
| 16 | ∞ | 1.249 | | |
| (Image plane) | ∞ | | | |

Aspheric Surface Data

First Surface $k = 0.000, A_4 = -1.269E-03, A_6 = -1.041E-03, A_8 = -6.082E-04,$
$A_{10} = -1.066E-03, A_{12} = 5.675E-04, A_{14} = -3.136E-04,$
$A_{16} = -1.053E-04$
Second Surface $k = 0.000, A_4 = -7.459E-02, A_6 = 3.177E-02, A_8 = -1.722E-04,$
$A_{10} = -2.787E-03, A_{12} = -1.500E-03, A_{14} = -2.828E-04,$
$A_{16} = 2.980E-04$
Third Surface $k = 0.000, A_4 = -7.996E-02, A_6 = 6.597E-02, A_8 = -5.343E-03,$
$A_{10} = -3.986E-03, A_{12} = -6.224E-04, A_{14} = 5.170E-04,$
$A_{16} = 8.386E-05$
Fourth Surface $k = 0.000, A_4 = -2.982E-02, A_6 = 4.276E-02, A_8 = -2.541E-03,$
$A_{10} = -2.635E-03, A_{12} = 1.060E-03, A_{14} = 2.993E-04,$
$A_{16} = 4.110E-04$
Fifth Surface $k = 0.000, A_4 = -5.158E-02, A_6 = 2.715E-03, A_8 = -1.639E-03,$
$A_{10} = 1.341E-03, A_{12} = 8.514E-04, A_{14} = 5.026E-05,$
$A_{16} = -3.478E-05$
Sixth Surface $k = 0.000, A_4 = -1.784E-02, A_6 = 1.970E-03, A_8 = 2.539E-04,$
$A_{10} = -3.310E-03, A_{12} = -1.014E-04, A_{14} = 2.088E-04,$
$A_{16} = -4.369E-05$
Seventh Surface $k = 0.000, A_4 = 2.912E-02, A_6 = -7.102E-03, A_8 = 5.929E-03,$
$A_{10} = -2.531E-04, A_{12} = -3.260E-03, A_{14} = 1.780E-03,$
$A_{16} = -3.061E-04$
Eighth Surface $k = 0.000, A_4 = 8.806E-03, A_6 = 9.910E-03, A_8 = -4.654E-04,$
$A_{10} = -3.451E-03, A_{12} = 2.664E-03, A_{14} = -6.962E-04,$
$A_{16} = 5.407E-05$
Ninth Surface $k = 0.000, A_4 = -3.991E-02, A_6 = 8.162E-03, A_8 = -5.350E-03,$
$A_{10} = -9.445E-05, A_{12} = 9.071E-04, A_{14} = -2.112E-04,$
$A_{16} = 1.218E-05$ Unit: mm Tenth Surface $k = 0.000, A_4 = -3.411E-02, A_6 = -1.380E-03, A_8 = -6.512E-05,$
$A_{10} = 1.677E-05, A_{12} = 1.676E-05, A_{14} = 2.441E-06,$
$A_{16} = -6.710E-07$
Eleventh Surface $k = 0.000, A_4 = -3.657E-02, A_6 = 9.329E-04, A_8 = 1.629E-04,$
$A_{10} = 1.382E-05, A_{12} = 2.057E-06, A_{14} = 3.601E-07,$
$A_{16} = -8.717E-08$
Twelfth Surface $k = 0.000, A_4 = -1.325E-02, A_6 = -1.573E-04, A_8 = -8.403E-05,$
$A_{10} = -9.963E-07, A_{12} = -1.366E-06, A_{14} = -1.165E-07,$
$A_{16} = 3.426E-08$
Thirteenth Surface $k = 0.000, A_4 = -2.772E-02, A_6 = 7.343E-03, A_8 = -1.330E-03,$
$A_{10} = 1.028E-04, A_{12} = -1.210E-05, A_{14} = 1.664E-06,$
$A_{16} = -7.563E-08$
Fourteenth Surface $k = 0.000, A_4 = -5.223E-02, A_6 = 9.961E-03, A_8 = -1.759E-03,$
$A_{10} = 2.358E-04, A_{12} = -2.025E-05, A_{14} = 9.640E-07,$
$A_{16} = -2.007E-08$ f1 = 4.68 mm
f2 = −12.71 mm
f3 = −25.94 mm
f4 = 7.95 mm
f5 = −103.56 mm
f6 = −22.43 mm
f7 = −7.43 mm
f23 = −8.31 mm
f45 = 8.51 mm
f67 = −5.49 mm The values of the respective conditional expressions are as follows:

f23/f1 = −1.77
f2/f3 = 0.49
f1/f = 0.65
f45/f67 = −1.55
f67/f = −0.77
f4/f = 1.11
f7/f = −1.04
D23/f = 0.084
D34/f = 0.065

Accordingly, the imaging lens of Numerical Data Example 1 satisfies the above-described conditional expressions. A distance on the optical axis from the object-side surface of the first lens L1 to the image plane IM (air conversion length for the filter 10) is 7.83 mm, and downsizing of the imaging lens is attained.

Figure 2:
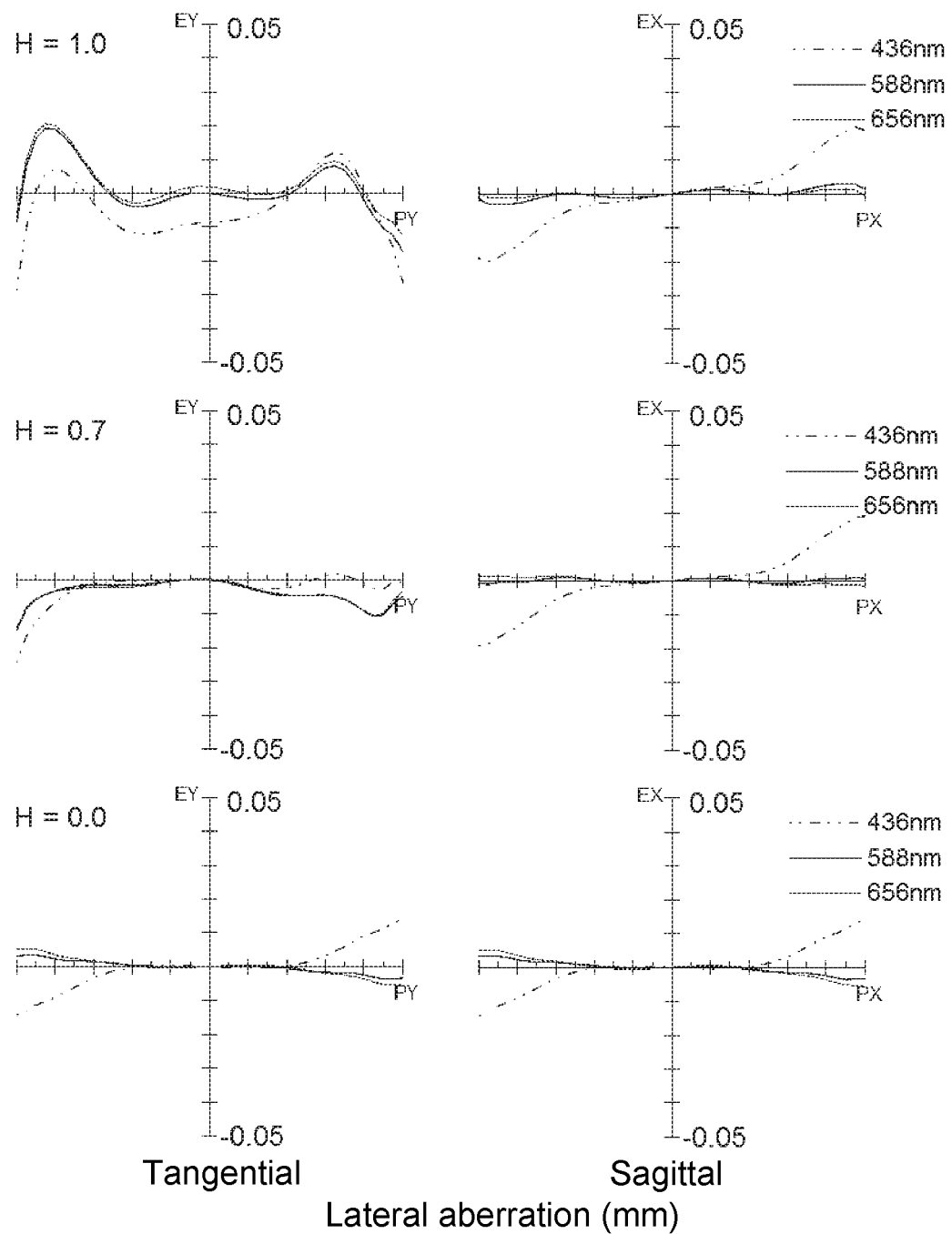
FIG. 2 is an aberration diagram showing a lateral aberration of the imaging lens of FIG. 1.
Figure 3:
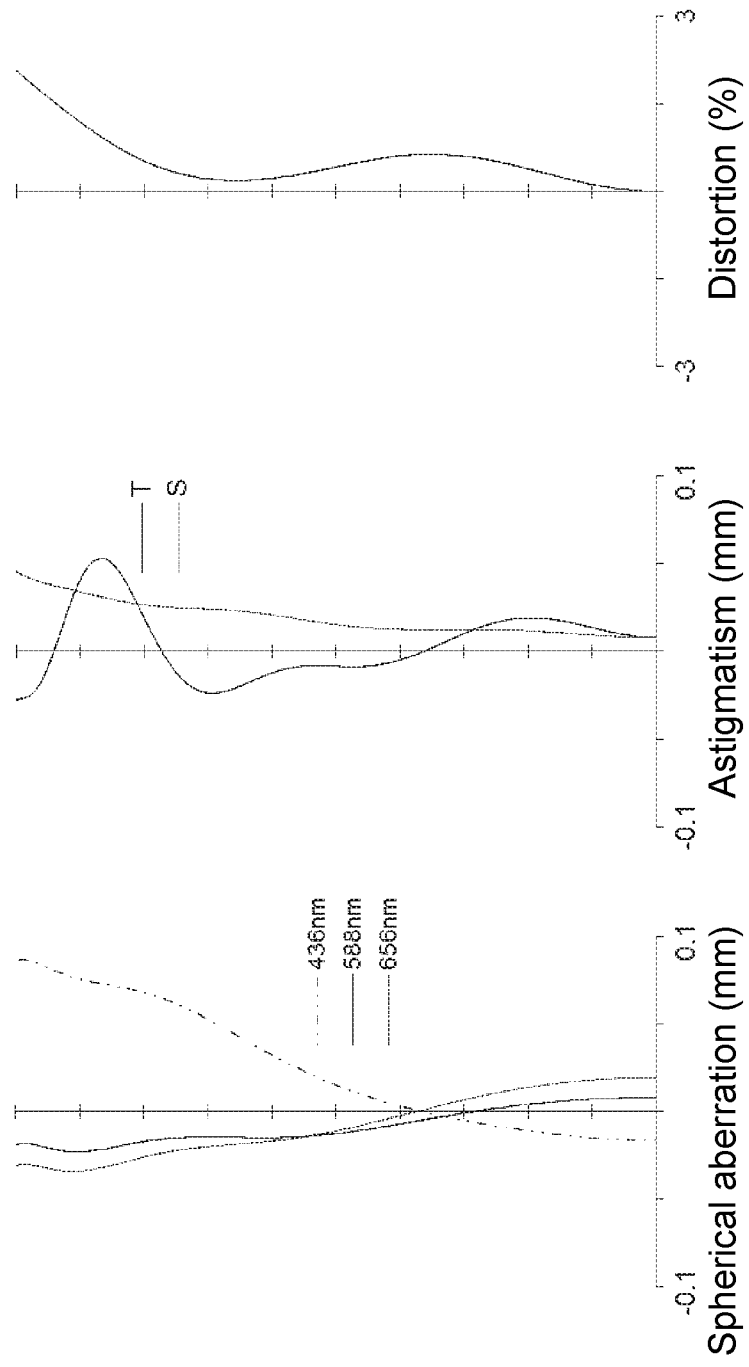
FIG. 3 is an aberration diagram showing a spherical aberration, astigmatism, and a distortion of the imaging lens of FIG. 1.
Figure 4:
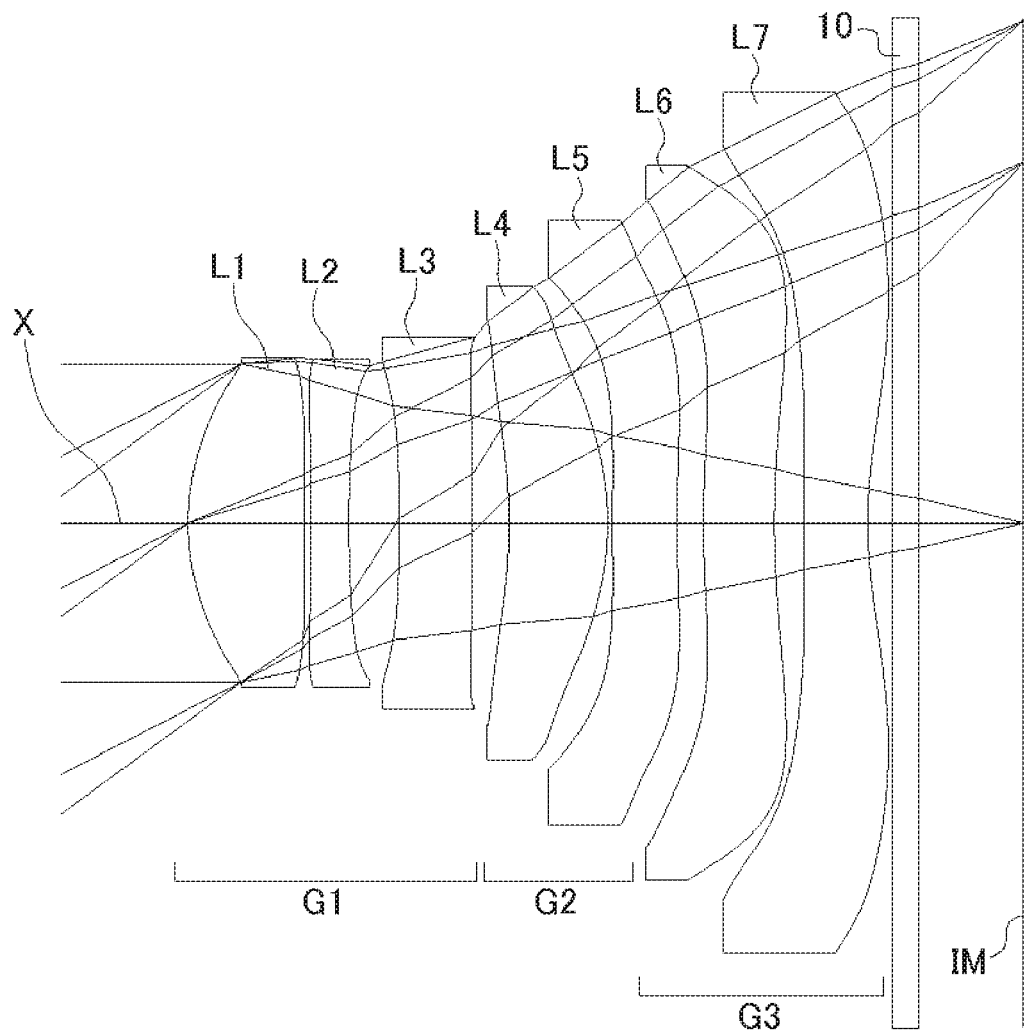
FIG. 4 shows a sectional view of a schematic configuration of an imaging lens in Numerical Data Example 2 according to the embodiment of the invention.

FIG. 2 shows a lateral aberration of the imaging lens in Numerical Data Example 1, which corresponds to a ratio H of each image height to the maximum image height (hereinafter referred to as "image height ratio H"), being divided into a tangential direction and a sagittal direction (which is the same in FIGS. 5, 8, 11, 14, and 17). Furthermore, FIG. 3 shows a spherical aberration (mm), astigmatism (mm), and a distortion (%), respectively. In the aberration diagrams, for the lateral aberration diagrams and spherical aberration diagrams, aberrations at each wavelength, i.e. a g line (436 nm), a d line (588 nm), and a C line (656 nm) are indicated. In astigmatism diagram, an aberration on a sagittal image surface S and an aberration on a tangential image surface T are respectively indicated (which are the same in FIGS. 6, 9, 12, 15, and 18). As shown in FIGS. 2 and 3, according to the imaging lens of Numerical Data Example 1, the aberrations are satisfactorily corrected.

Numerical Data Example 2

Basic data are shown below.

f=5.44 mm, Fno=2.2, ω=36.3°

Unit: mm

Surface Data

| Surface Number i | r | d | nd | vd |
|---|---|---|---|---|
| (Object) | ∞ | ∞ | | |
| 1* (Stop) | 2.037 | 0.916 | 1.5346 | 56.1 (=vd1) |
| 2* | 17.722 | 0.056 | | |
| 3* | 89.558 | 0.297 | 1.6355 | 24.0 (=vd2) |
| 4* | 9.329 | 0.397 (=D23) | | |
| 5* | −43.041 | 0.579 | 1.6355 | 24.0 (=vd3) |
| 6* | 252.636 | 0.291 (=D34) | | |
| 7* | −4.082 | 0.780 | 1.5346 | 56.1 (=vd4) |
| 8* | −2.345 | 0.037 | | |
| 9* | 30.893 | 0.510 | 1.6355 | 24.0 (=vd5) |
| 10* | 9.990 | 0.208 | | |
| 11* | 7.396 | 0.561 | 1.5346 | 56.1 (=vd6) |
| 12* | 7.529 | 0.236 | | |
| 13* | 35.369 | 0.500 | 1.5346 | 56.1 (=vd7) |
| 14* | 3.585 | 0.200 | | |
| 15 | ∞ | 0.200 | 1.5168 | 64.2 |
| 16 | ∞ | 0.832 | | |
| (Image plane) | ∞ | | | |

Aspheric Surface Data

First Surface k = 0.000, $A_4$ = 1.278E−03, $A_6$ = −1.344E−03, $A_8$ = −6.049E−04, $A_{10}$ = −9.928E−04, $A_{12}$ = 5.549E−04, $A_{14}$ = −3.389E−04, $A_{16}$ = −1.053E−04

Second Surface k = 0.000, $A_4$ = −7.369E−02, $A_6$ = 3.182E−02, $A_8$ = −2.362E−04, $A_{10}$ = −2.772E−03, $A_{12}$ = −1.452E−03, $A_{14}$ = −2.374E−04, $A_{16}$ = 3.103E−04

Third Surface k = 0.000, $A_4$ = −8.231E−02, $A_6$ = 6.611E−02, $A_8$ = −5.107E−03, $A_{10}$ = −3.861E−03, $A_{12}$ = −5.837E−04, $A_{14}$ = 5.444E−04, $A_{16}$ = 1.194E−04

Fourth Surface k = 0.000, $A_4$ = −2.913E−02, $A_6$ = 4.127E−02, $A_8$ = −2.459E−03, $A_{10}$ = −2.343E−03, $A_{12}$ = 1.134E−03, $A_{14}$ = 2.487E−04, $A_{16}$ = 3.403E−04

Fifth Surface k = 0.000, $A_4$ = −5.270E−02, $A_6$ = 3.670E−03, $A_8$ = −1.855E−03, $A_{10}$ = 9.253E−04, $A_{12}$ = 6.531E−04, $A_{14}$ = 5.241E−05, $A_{16}$ = 3.456E−05

Sixth Surface k = 0.000, $A_4$ = −1.418E−02, $A_6$ = 2.764E−03, $A_8$ = 6.929E−04, $A_{10}$ = −1.418E−04, $A_{12}$ = −2.387E−05, $A_{14}$ = 2.459E−04, $A_{16}$ = −2.662E−05

Seventh Surface k = 0.000, $A_4$ = 3.184E−02, $A_6$ = −6.312E−03, $A_8$ = 5.993E−03, $A_{10}$ = −2.065E−04, $A_{12}$ = −3.225E−03, $A_{14}$ = 1.791E−03, $A_{16}$ = −3.069E−04

Eighth Surface k = 0.000, $A_4$ = 9.352E−03, $A_6$ = 9.939E−03, $A_8$ = −3.373E−04, $A_{10}$ = −3.412E−03, $A_{12}$ = 2.668E−03, $A_{14}$ = −6.963E−04, $A_{16}$ = 5.389E−05

Ninth Surface k = 0.000, $A_4$ = −4.199E−02, $A_6$ = 7.392E−03, $A_8$ = −5.501E−03, $A_{10}$ = −1.110E−04, $A_{12}$ = 9.072E−04, $A_{14}$ = −2.104E−04, $A_{16}$ = 1.245E−05

Unit: mm

Tenth Surface k = 0.000, $A_4$ = −3.196E−02, $A_6$ = −8.737E−04, $A_8$ = 3.452E−05, $A_{10}$ = 2.494E−05, $A_{12}$ = 1.701E−05, $A_{14}$ = 2.379E−06, $A_{16}$ = −6.898E−07

Eleventh Surface k = 0.000, $A_4$ = −3.494E−02, $A_6$ = 9.838E−04, $A_8$ = 1.285E−04, $A_{10}$ = 1.041E−05, $A_{12}$ = 1.781E−06, $A_{14}$ = 3.140E−07, $A_{16}$ = −1.017E−07

Twelfth Surface k = 0.000, $A_4$ = −1.149E−02, $A_6$ = 1.483E−04, $A_8$ = −8.259E−05, $A_{10}$ = −4.430E−06, $A_{12}$ = −1.733E−06, $A_{14}$ = −1.292E−07, $A_{16}$ = 3.717E−08

Thirteenth Surface k = 0.000, $A_4$ = −2.715E−02, $A_6$ = 8.014E−03, $A_8$ = −1.326E−03, $A_{10}$ = 1.028E−04, $A_{12}$ = −1.206E−05, $A_{14}$ = 1.663E−06, $A_{16}$ = −7.748E−08

Fourteenth Surface k = 0.000, $A_4$ = −4.908E−02, $A_6$ = 9.595E−03, $A_8$ = −1.765E−03, $A_{10}$ = 2.358E−04, $A_{12}$ = −2.026E−05, $A_{14}$ = 9.640E−07, $A_{16}$ = −1.996E−08 f1 = 4.22 mm
f2 = −16.41 mm
f3 = −57.82 mm
f4 = 8.91 mm
f5 = −23.45 mm
f6 = 317.09 mm
f7 = −7.50 mm
f23 = −12.71 mm
f45 = 14.46 mm
f67 = −7.92 mm

The values of the respective conditional expressions are as follows:

f23/f1 = −3.01
f2/f3 = 0.28
f1/f = 0.78
f45/f67 = −1.83
f67/f = −1.46
f4/f = 1.64
f7/f = −1.38
D23/f = 0.073
D34/f = 0.053

Accordingly, the imaging lens of Numerical Data Example 2 satisfies the above-described conditional expressions. A distance on the optical axis from the object-side surface of the first lens L1 to the image plane IM (air conversion length for the filter 10) is 6.53 mm, and downsizing of the imaging lens is attained.

Figure 5:
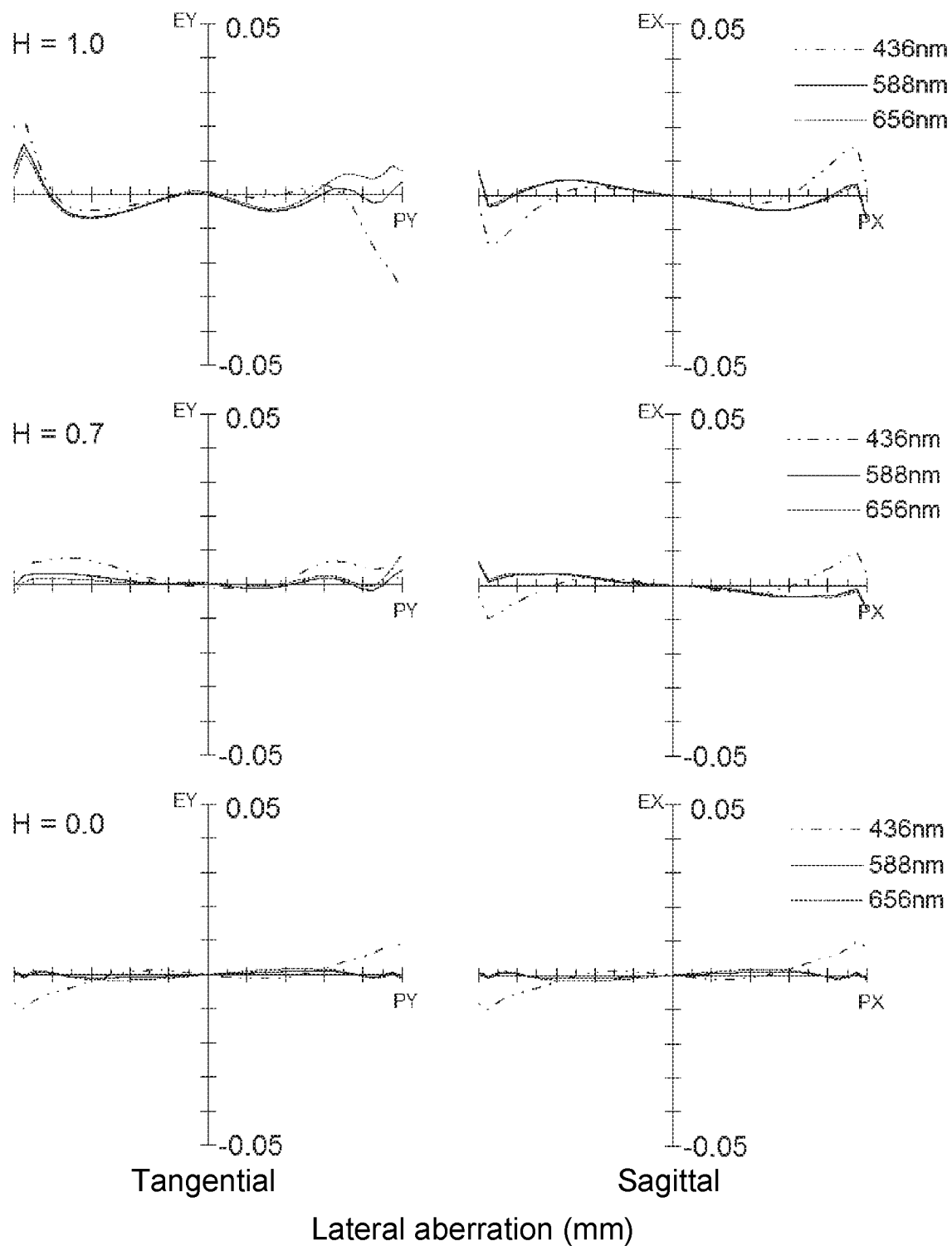
FIG. 5 is an aberration diagram showing a lateral aberration of the imaging lens of FIG. 4.
Figure 6:
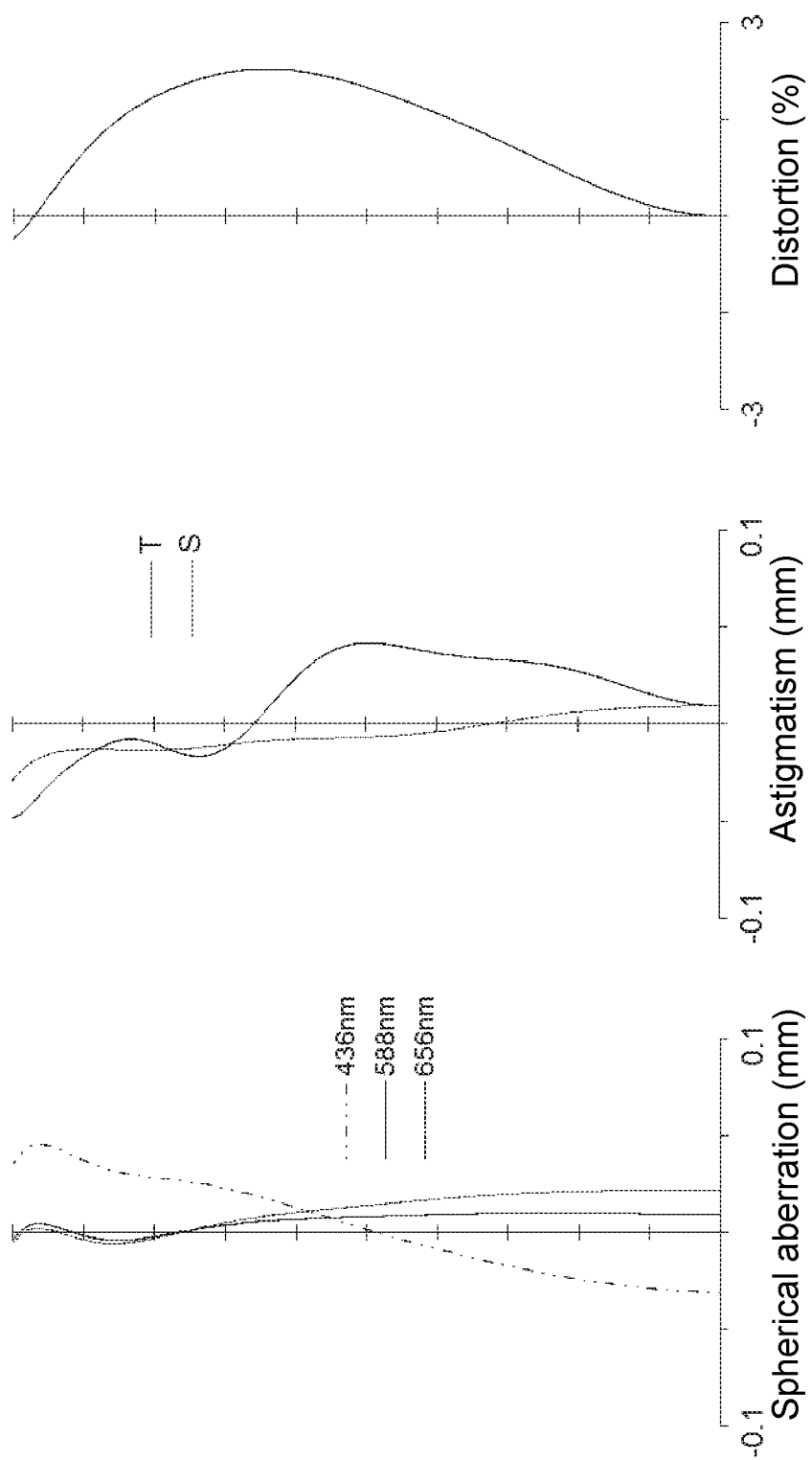
FIG. 6 is an aberration diagram showing a spherical aberration, astigmatism, and a distortion of the imaging lens of FIG. 4.
Figure 7:
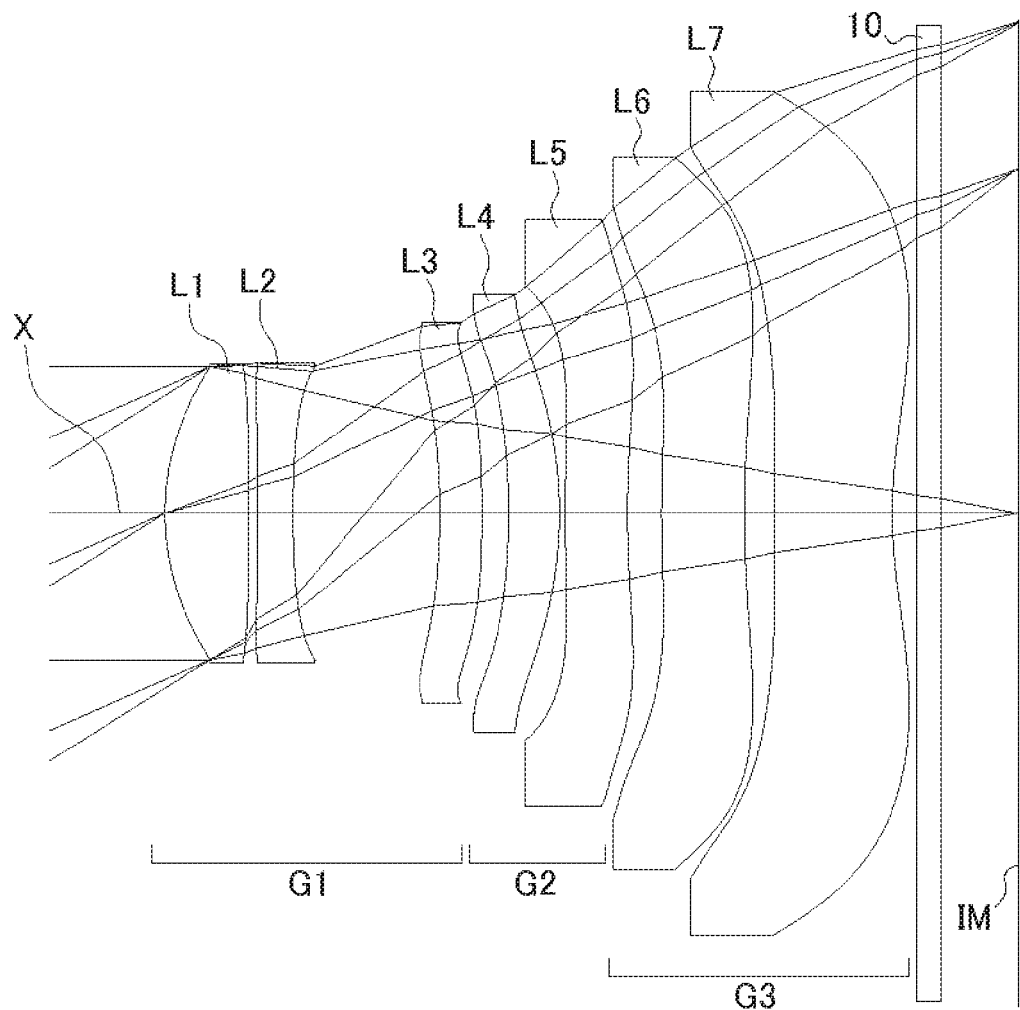
FIG. 7 shows a sectional view of a schematic configuration of an imaging lens in Numerical Data Example 3 according to the embodiment of the invention.

FIG. 5 shows the lateral aberration of the imaging lens in Numerical Data Example 2, which corresponds to the image height ratio H of the imaging lens. FIG. 6 shows a spherical aberration (mm), astigmatism (mm), and a distortion (%), respectively. As shown in FIGS. 5 and 6, according to the imaging lens of Numerical Data Example 2, the aberrations are also satisfactorily corrected.

Numerical Data Example 3

Basic data are shown below.

f=6.32 mm, Fno=2.6, ω=32.3°

Unit: mm

Surface Data

| Surface Number i | r | d | nd | vd |
|---|---|---|---|---|
| (Object) | ∞ | ∞ | | |
| 1* (Stop) | 2.081 | 0.680 | 1.5346 | 56.1 (=vd1) |
| 2* | 20.921 | 0.080 | | |
| 3* | 70.779 | 0.290 | 1.6355 | 24.0 (=vd2) |
| 4* | 8.233 | 1.201 (=D23) | | |
| 5* | −7.147 | 0.343 | 1.6355 | 24.0 (=vd3) |
| 6* | −10.623 | 0.221 (=D34) | | |
| 7* | −6.248 | 0.414 | 1.5346 | 56.1 (=vd4) |
| 8* | −3.507 | 0.047 | | |
| 9* | 17.703 | 0.510 | 1.6355 | 24.0 (=vd5) |
| 10* | 8.206 | 0.283 | | |
| 11* | 11.066 | 0.677 | 1.5346 | 56.1 (=vd6) |
| 12* | 8.979 | 0.247 | | |
| 13* | 33.195 | 0.963 | 1.5346 | 56.1 (=vd7) |
| 14* | 3.725 | 0.200 | | |
| 15 | ∞ | 0.200 | 1.5168 | 64.2 |
| 16 | ∞ | 0.628 | | |
| (Image plane) | ∞ | | | |

Aspheric Surface Data

First Surface k = 0.000, $A_4$ = 2.316E−03, $A_6$ = −6.966E−04, $A_8$ = −8.666E−04, $A_{10}$ = −8.910E−04, $A_{12}$ = 7.588E−04, $A_{14}$ = −3.174E−04, $A_{16}$ = −3.121E−04

Second Surface k = 0.000, $A_4$ = −6.708E−02, $A_6$ = 3.193E−02, $A_8$ = 1.178E−04, $A_{10}$ = −3.199E−03, $A_{12}$ = −1.616E−03, $A_{14}$ = −1.742E−04, $A_{16}$ = 3.390E−04

Third Surface k = 0.000, $A_4$ = −7.504E−02, $A_6$ = 6.484E−02, $A_8$ = −7.363E−03, $A_{10}$ = −4.744E−03, $A_{12}$ = −6.707E−04, $A_{14}$ = 6.906E−04, $A_{16}$ = 3.379E−04

Fourth Surface k = 0.000, $A_4$ = −5.473E−03, $A_6$ = 4.021E−02, $A_8$ = −4.702E−03, $A_{10}$ = −2.717E−03, $A_{12}$ = 1.284E−03, $A_{14}$ = 3.257E−04, $A_{16}$ = 7.159E−05

Fifth Surface k = 0.000, $A_4$ = −3.325E−02, $A_6$ = 7.261E−03, $A_8$ = 4.647E−04, $A_{10}$ = 1.109E−03, $A_{12}$ = 2.867E−04, $A_{14}$ = −1.887E−05, $A_{16}$ = −2.570E−05

Sixth Surface k = 0.000, $A_4$ = −4.105E−02, $A_6$ = 3.279E−05, $A_8$ = 1.900E−03, $A_{10}$ = 2.365E−04, $A_{12}$ = 3.118E−05, $A_{14}$ = 2.388E−04, $A_{16}$ = −2.065E−05

Seventh Surface k = 0.000, $A_4$ = −9.376E−03, $A_6$ = −1.369E−02, $A_8$ = 7.969E−03, $A_{10}$ = −4.465E−06, $A_{12}$ = −3.255E−03, $A_{14}$ = 1.808E−03, $A_{16}$ = −2.768E−04

Eighth Surface k = 0.000, $A_4$ = −6.996E−03, $A_6$ = 1.005E−02, $A_8$ = −1.165E−03, $A_{10}$ = −3.518E−03, $A_{12}$ = 2.675E−03, $A_{14}$ = −6.821E−04, $A_{16}$ = 5.876E−05

Ninth Surface k = 0.000, $A_4$ = −2.105E−02, $A_6$ = 2.209E−03, $A_8$ = −4.117E−03, $A_{10}$ = −1.343E−04, $A_{12}$ = 8.072E−04, $A_{14}$ = −2.255E−04, $A_{16}$ = 1.704E−05

Unit: mm

Tenth Surface k = 0.000, $A_4$ = −1.872E−02, $A_6$ = −1.529E−03, $A_8$ = −4.349E−05, $A_{10}$ = 1.085E−05, $A_{12}$ = 1.560E−05, $A_{14}$ = 2.371E−06, $A_{16}$ = −6.171E−07

Eleventh Surface k = 0.000, $A_4$ = −3.607E−02, $A_6$ = 1.638E−03, $A_8$ = 1.660E−04, $A_{10}$ = 1.373E−05, $A_{12}$ = 1.855E−06, $A_{14}$ = 2.700E−07, $A_{16}$ = −1.163E−07

Twelfth Surface k = 0.000, $A_4$ = −1.004E−02, $A_6$ = −8.471E−04, $A_8$ = 9.471E−05, $A_{10}$ = 2.438E−06, $A_{12}$ = −1.674E−06, $A_{14}$ = −1.484E−07, $A_{16}$ = 2.570E−08

Thirteenth Surface k = 0.000, $A_4$ = −2.975E−02, $A_6$ = 8.262E−03, $A_8$ = −1.318E−03, $A_{10}$ = 1.029E−04, $A_{12}$ = −1.209E−05, $A_{14}$ = 1.657E−06, $A_{16}$ = −7.825E−08

Fourteenth Surface k = 0.000, $A_4$ = −4.975E−02, $A_6$ = 9.427E−03, $A_8$ = −1.767E−03, $A_{10}$ = 2.350E−04, $A_{12}$ = −2.032E−05, $A_{14}$ = 9.663E−07, $A_{16}$ = −1.916E−08 f1 = 4.27 mm
f2 = −14.69 mm
f3 = −35.74 mm
f4 = 14.21 mm
f5 = −24.58 mm
f6 = −100.39 mm
f7 = −7.94 mm
f23 = −10.26 mm
f45 = 32.66 mm
f67 = −7.44 mm

The values of the respective conditional expressions are as follows:

f23/f1 = −2.40
f2/f3 = 0.41
f1/f = 0.68
f45/f67 = −4.39
f67/f = −1.18
f4/f = 2.25
f7/f = −1.26
D23/f = 0.19
D34/f = 0.035

Accordingly, the imaging lens of Numerical Data Example 3 satisfies the above-described conditional expressions. A distance on the optical axis from the object-side surface of the first lens L1 to the image plane IM (air conversion length for the filter 10) is 6.92 mm, and downsizing of the imaging lens is attained.

Figure 8:
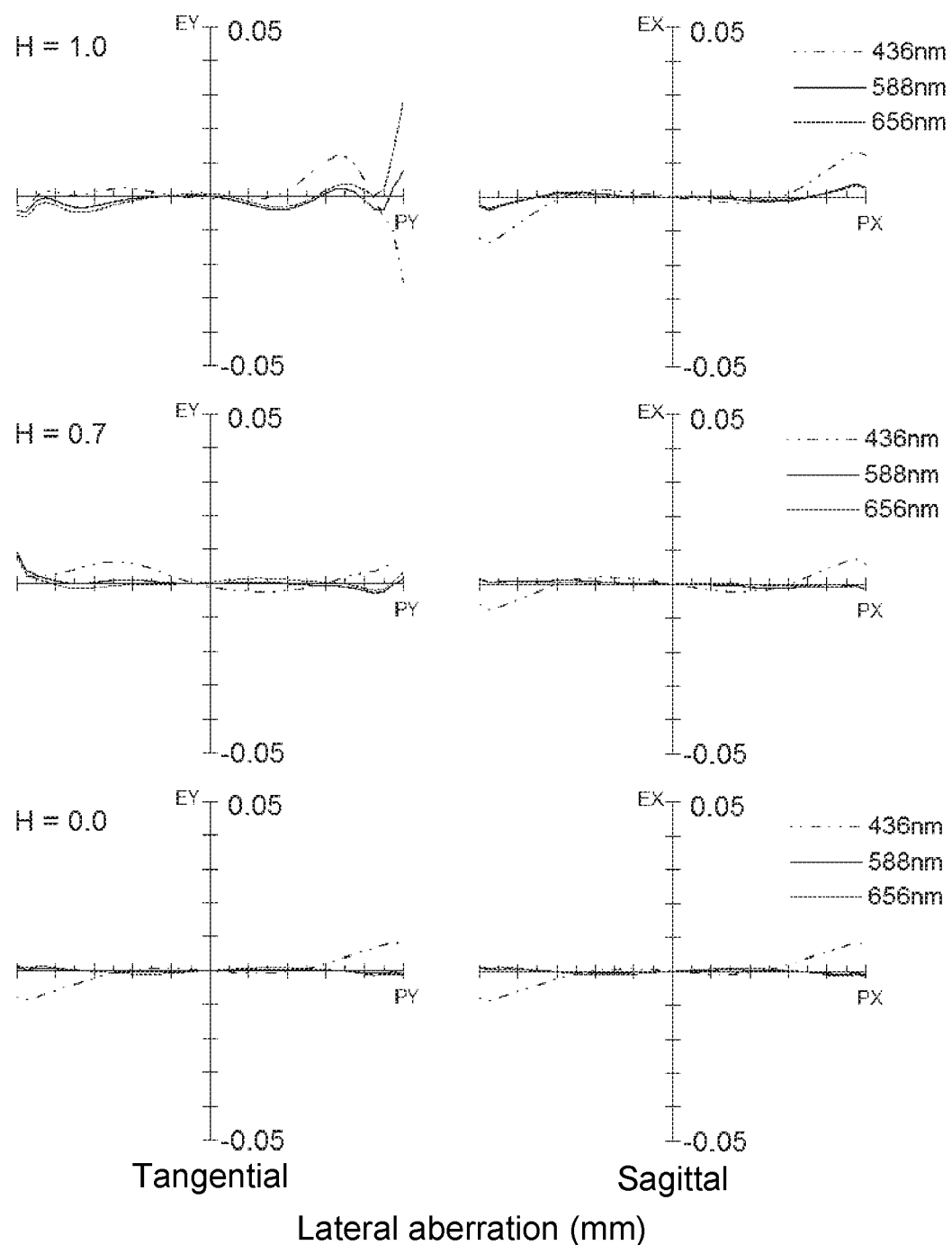
FIG. 8 is an aberration diagram showing a lateral aberration of the imaging lens of FIG. 7.
Figure 9:
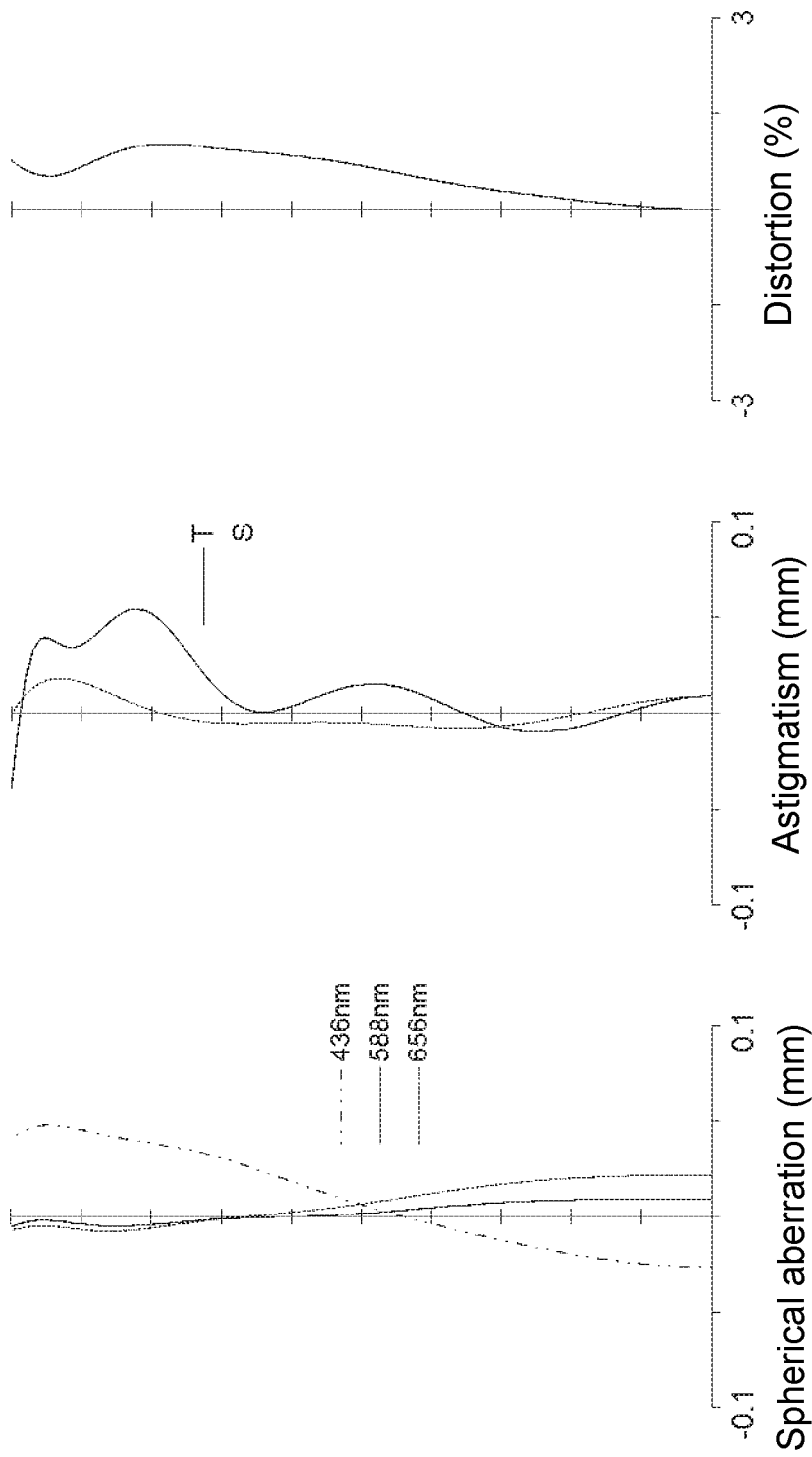
FIG. 9 is an aberration diagram showing a spherical aberration, astigmatism, and a distortion of the imaging lens of FIG. 7.
Figure 10:
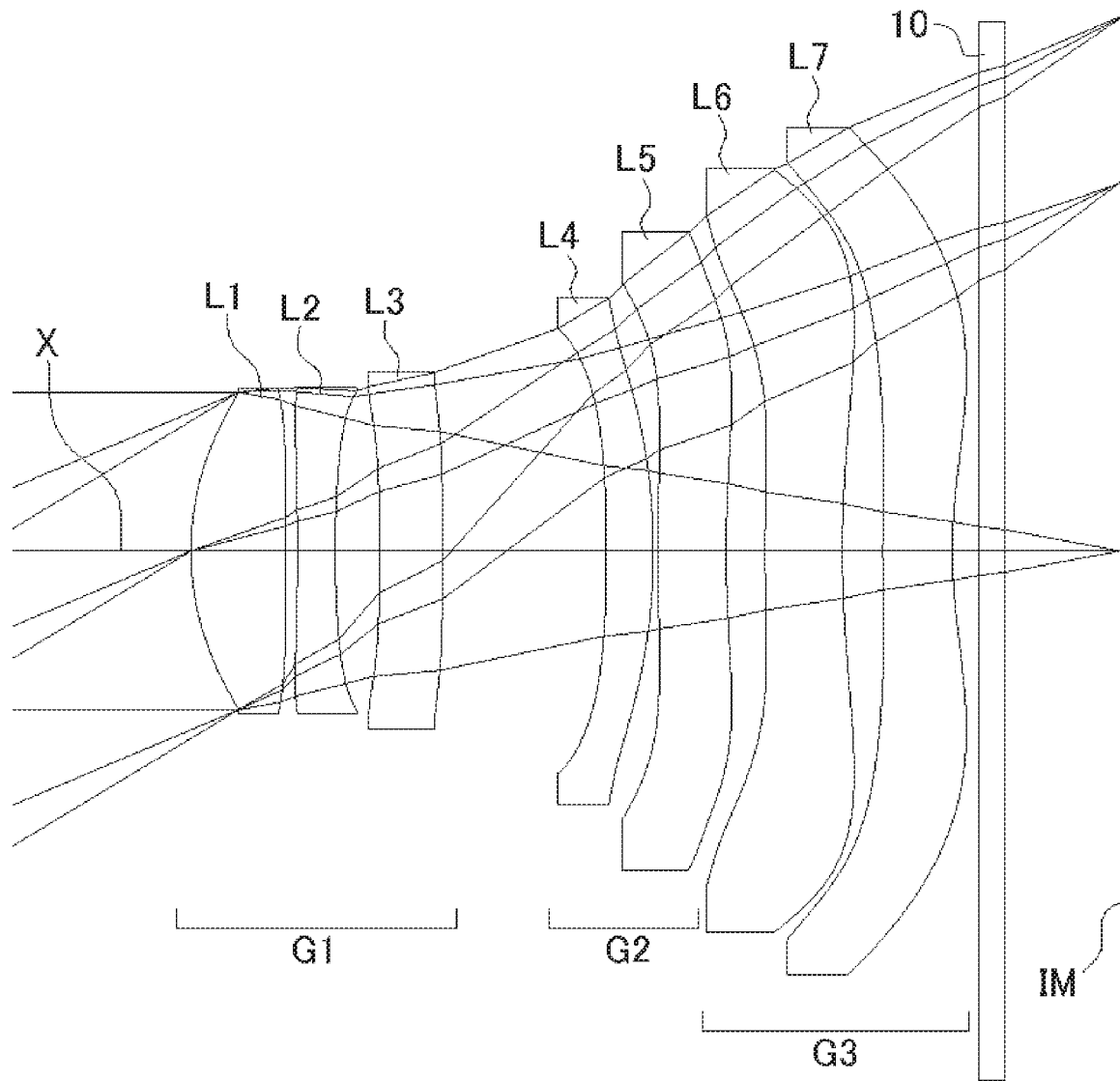
FIG. 10 shows a sectional view of a schematic configuration of an imaging lens in Numerical Data Example 4 according to the embodiment of the invention.

FIG. 8 shows the lateral aberration of the imaging lens in Numerical Data Example 3, which corresponds to the image height ratio H of the imaging lens. FIG. 9 shows a spherical aberration (mm), astigmatism (mm), and a distortion (%), respectively. As shown in FIGS. 8 and 9, according to the imaging lens of Numerical Data Example 3, the aberrations are satisfactorily corrected.

Numerical Data Example 4

Basic data are shown below.

f=6.58 mm, Fno=2.7, ω=31.3°

Unit: mm

Surface Data

| Surface Number i | r | d | nd | vd |
|---|---|---|---|---|
| (Object) | ∞ | ∞ | | |
| 1* (Stop) | 2.094 | 0.709 | 1.5346 | 56.1 (=vd1) |
| 2* | 18.265 | 0.091 | | |
| 3* | 149.869 | 0.286 | 1.6355 | 24.0 (=vd2) |
| 4* | 8.321 | 0.332 (=D23) | | |
| 5* | −44.743 | 0.474 | 1.6355 | 24.0 (=vd3) |
| 6* | 631.923 | 1.233 (=D34) | | |
| 7* | −12.494 | 0.352 | 1.5346 | 56.1 (=vd4) |
| 8* | −4.802 | 0.037 | | |
| 9* | 20.999 | 0.510 | 1.6355 | 24.0 (=vd5) |
| 10* | 8.539 | 0.294 | | |
| 11* | 12.428 | 0.580 | 1.5346 | 56.1 (=vd6) |
| 12* | 8.742 | 0.303 | | |
| 13* | 22.998 | 0.523 | 1.5346 | 56.1 (=vd7) |
| 14* | 3.749 | 0.200 | | |
| 15 | ∞ | 0.200 | 1.5168 | 64.2 |
| 16 (Image plane) | ∞ | 0.867 | | |

Aspheric Surface Data

First Surface k = 0.000, $A_4$ = −7.892E−04, $A_6$ = −1.001E−03, $A_8$ = −1.142E−03, $A_{10}$ = −1.165E−03, $A_{12}$ = 6.915E−04, $A_{14}$ = −2.917E−04, $A_{16}$ = −2.805E−04

Second Surface k = 0.000, $A_4$ = −7.015E−02, $A_6$ = 3.117E−02, $A_8$ = −4.145E−04, $A_{10}$ = −3.478E−03, $A_{12}$ = −1.637E−03, $A_{14}$ = −1.442E−04, $A_{16}$ = 3.801E−04

Third Surface k = 0.000, $A_4$ = −7.109E−02, $A_6$ = 6.425E−02, $A_8$ = −7.337E−03, $A_{10}$ = −4.771E−03, $A_{12}$ = −7.589E−04, $A_{14}$ = 6.636E−04, $A_{16}$ = 3.497E−04

Fourth Surface k = 0.000, $A_4$ = −1.703E−02, $A_6$ = 4.106E−02, $A_8$ = −5.205E−03, $A_{10}$ = −2.994E−03, $A_{12}$ = 1.503E−03, $A_{14}$ = 5.453E−04, $A_{16}$ = 1.614E−04

Fifth Surface k = 0.000, $A_4$ = −4.694E−02, $A_6$ = 4.353E−03, $A_8$ = 6.064E−04, $A_{10}$ = 1.506E−03, $A_{12}$ = 5.856E−04, $A_{14}$ = 1.643E−04, $A_{16}$ = 1.317E−04

Sixth Surface k = 0.000, $A_4$ = −3.486E−02, $A_6$ = 1.909E−03, $A_8$ = 2.397E−03, $A_{10}$ = 2.932E−04, $A_{12}$ = −1.362E−05, $A_{14}$ = 1.947E−04, $A_{16}$ = −3.844E−05

Seventh Surface k = 0.000, $A_4$ = −1.544E−02, $A_6$ = −1.150E−02, $A_8$ = 7.726E−03, $A_{10}$ = −3.196E−04, $A_{12}$ = −3.360E−03, $A_{14}$ = 1.780E−03, $A_{16}$ = −2.839E−04

Eighth Surface k = 0.000, $A_4$ = −9.514E−03, $A_6$ = 8.817E−03, $A_8$ = −1.361E−03, $A_{10}$ = −3.560E−03, $A_{12}$ = 2.668E−03, $A_{14}$ = −6.826E−04, $A_{16}$ = 6.002E−05

Ninth Surface k = 0.000, $A_4$ = −1.786E−02, $A_6$ = 6.056E−03, $A_8$ = −4.587E−03, $A_{10}$ = −2.595E−04, $A_{12}$ = 8.166E−04, $A_{14}$ = −2.182E−04, $A_{16}$ = 1.859E−05

Unit: mm

Tenth Surface k = 0.000, $A_4$ = −1.829E−02, $A_6$ = −1.818E−03, $A_8$ = −9.221E−05, $A_{10}$ = 9.675E−06, $A_{12}$ = 1.590E−05, $A_{14}$ = 2.459E−06, $A_{16}$ = −5.978E−07

Eleventh Surface k = 0.000, $A_4$ = −3.668E−02, $A_6$ = 1.601E−03, $A_8$ = 1.713E−04, $A_{10}$ = 1.451E−05, $A_{12}$ = 1.972E−06, $A_{14}$ = 2.845E−07, $A_{16}$ = −1.146E−07

Twelfth Surface k = 0.000, $A_4$ = −7.337E−03, $A_6$ = −8.988E−04, $A_8$ = 7.228E−05, $A_{10}$ = 2.606E−07, $A_{12}$ = −1.753E−06, $A_{14}$ = −1.417E−07, $A_{16}$ = 2.780E−08

Thirteenth Surface k = 0.000, $A_4$ = −3.009E−02, $A_6$ = 8.104E−03, $A_8$ = −1.311E−03, $A_{10}$ = 1.031E−04, $A_{12}$ = −1.212E−05, $A_{14}$ = 1.653E−06, $A_{16}$ = −7.866E−08

Fourteenth Surface k = 0.000, $A_4$ = −5.724E−02, $A_6$ = 9.863E−03, $A_8$ = −1.759E−03, $A_{10}$ = 2.354E−04, $A_{12}$ = −2.034E−05, $A_{14}$ = 9.676E−07, $A_{16}$ = −1.898E−08 f1 = 4.36 mm
f2 = −13.87 mm
f3 = −65.73 mm
f4 = 14.36 mm
f5 = −23.01 mm
f6 = −58.33 mm
f7 = −8.46 mm
f23 = −11.41 mm
f45 = 36.40 mm
f67 = −7.41 mm

The values of the respective conditional expressions are as follows:

f23/f1 = −2.62
f2/f3 = 0.21
f1/f = 0.66
f45/f67 = −4.91
f67/f = −1.13
f4/f = 2.18
f7/f = −1.29
D23/f = 0.050
D34/f = 0.19

Accordingly, the imaging lens of Numerical Data Example 4 satisfies the above-described conditional expressions. A distance on the optical axis from the object-side surface of the first lens L1 to the image plane IM (air conversion length for the filter 10) is 6.92 mm, and downsizing of the imaging lens is attained.

Figure 11:
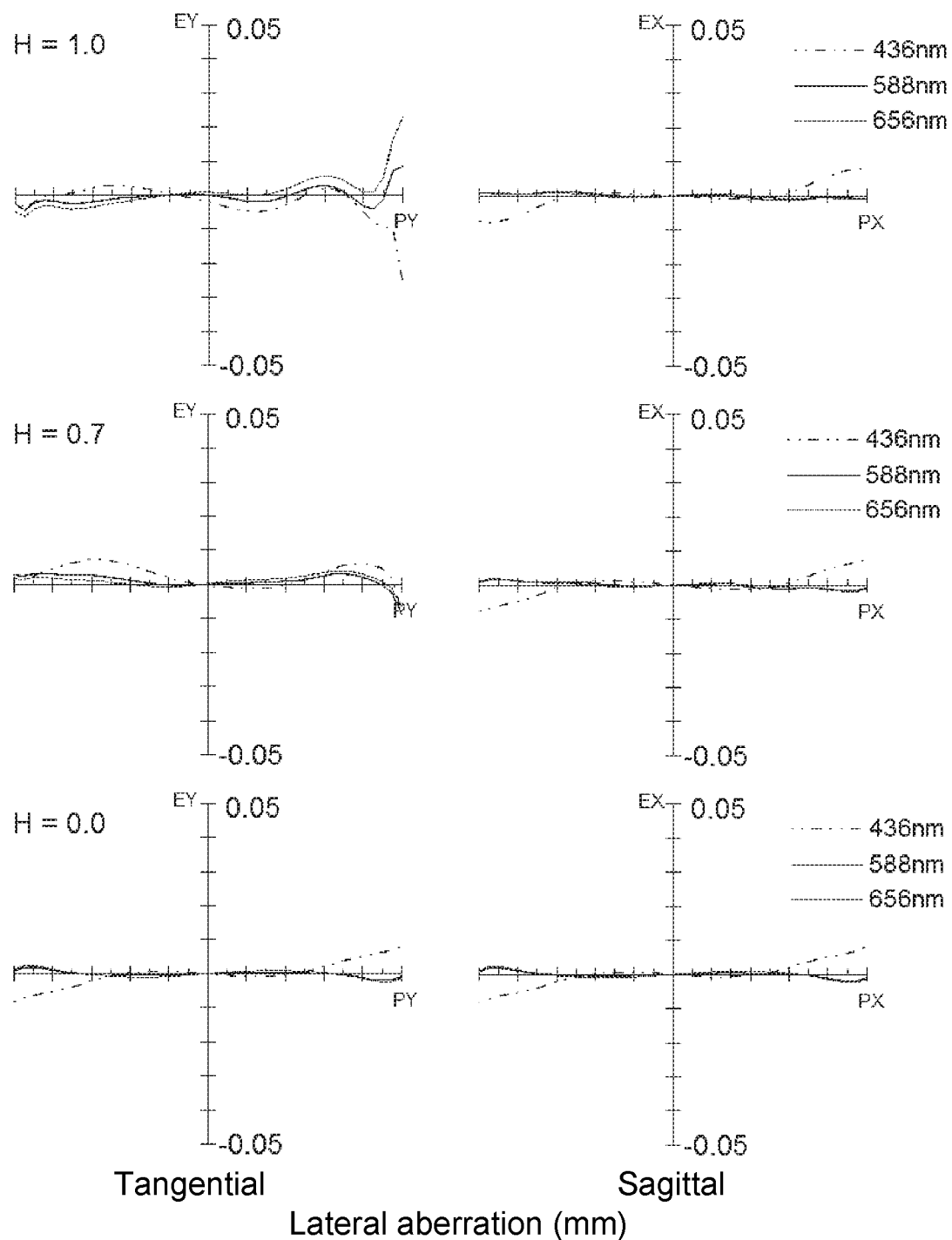
FIG. 11 is an aberration diagram showing a lateral aberration of the imaging lens of FIG. 10.
Figure 12:
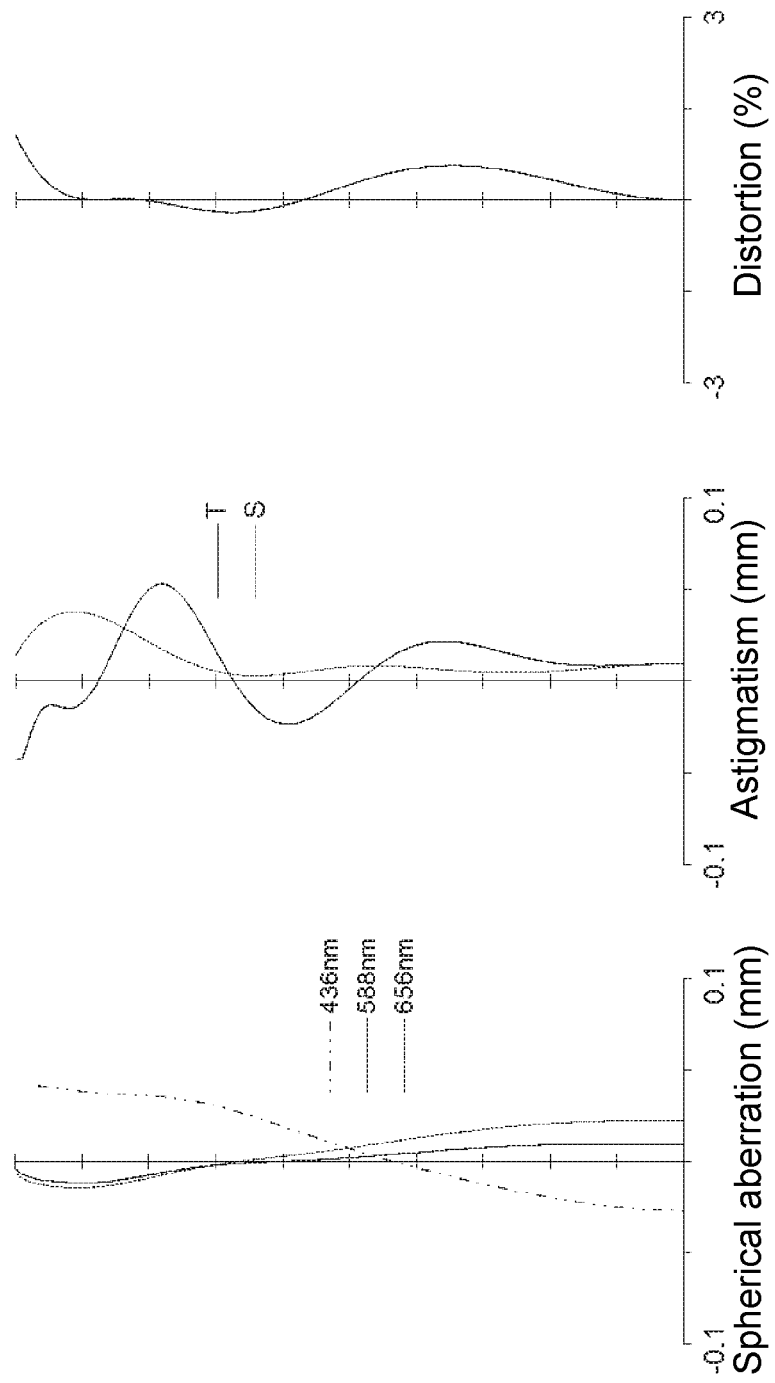
FIG. 12 is an aberration diagram showing a spherical aberration, astigmatism, and a distortion of the imaging lens of FIG. 10.
Figure 13:
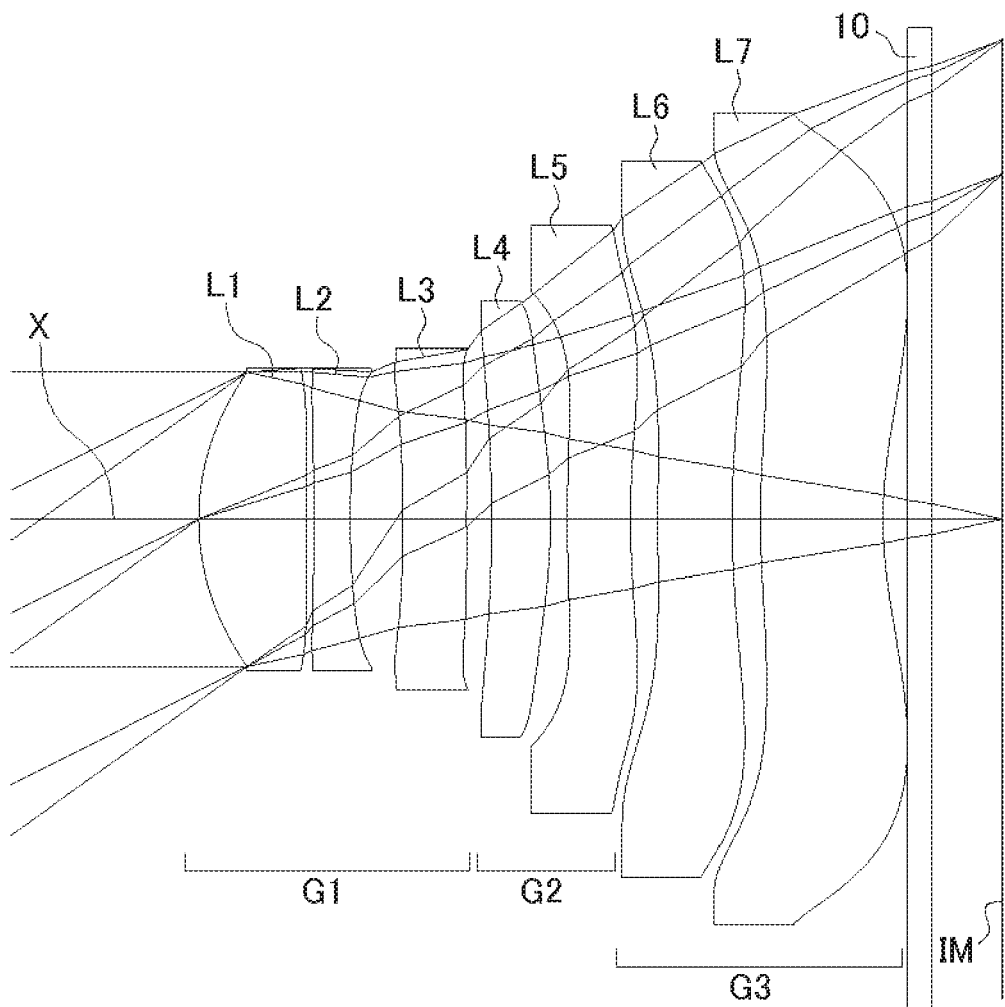
FIG. 13 shows a sectional view of a schematic configuration of an imaging lens in Numerical Data Example 5 according to the embodiment of the invention.

FIG. 11 shows the lateral aberration of the imaging lens in Numerical Data Example 4, which corresponds to the image height ratio H of the imaging lens. FIG. 12 shows a spherical aberration (mm), astigmatism (mm), and a distortion (%), respectively. As shown in FIGS. 11 and 12, according to the imaging lens of Numerical Data Example 4, the aberrations are also satisfactorily corrected.

Numerical Data Example 5

Basic data are shown below.

f=5.58 mm, Fno=2.3, ω=35.6°

Unit: mm

Surface Data

| Surface Number i | r | d | nd | vd |
|---|---|---|---|---|
| (Object) | ∞ | ∞ | | |
| 1* (Stop) | 1.975 | 0.875 | 1.5346 | 56.1 (=vd1) |
| 2* | 21.088 | 0.056 | | |
| 3* | 64.594 | 0.300 | 1.6355 | 24.0 (=vd2) |
| 4* | 7.407 | 0.425 (=D23) | | |
| 5* | −36.756 | 0.518 | 1.6355 | 24.0 (=vd3) |
| 6* | 71.409 | 0.204 (=D34) | | |
| 7* | −13.891 | 0.481 | 1.5346 | 56.1 (=vd4) |
| 8* | −4.859 | 0.138 | | |
| 9* | 12.382 | 0.510 | 1.6355 | 24.0 (=vd5) |
| 10* | 6.912 | 0.224 | | |
| 11* | 27.816 | 0.601 | 1.5346 | 56.1 (=vd6) |
| 12* | 8.508 | 0.231 | | |
| 13* | 7.135 | 0.995 | 1.5346 | 56.1 (=vd7) |
| 14* | 3.387 | 0.200 | | |
| 15 | ∞ | 0.200 | 1.5168 | 64.2 |
| 16 (Image plane) | ∞ | 0.576 | | |

Aspheric Surface Data

First Surface k = 0.000, $A_4$ = 4.278E−04, $A_6$ = −1.403E−03, $A_8$ = −4.651E−04, $A_{10}$ = −1.011E−03, $A_{12}$ = 7.232E−04, $A_{14}$ = −2.463E−04, $A_{16}$ = −2.287E−04

Second Surface k = 0.000, $A_4$ = −6.203E−02, $A_6$ = 3.291E−02, $A_8$ = −2.600E−03, $A_{10}$ = −4.935E−03, $A_{12}$ = −1.725E−03, $A_{14}$ = 1.706E−04, $A_{16}$ = 4.540E−04

Third Surface k = 0.000, $A_4$ = −6.750E−02, $A_6$ = 6.133E−02, $A_8$ = −8.453E−03, $A_{10}$ = −5.173E−03, $A_{12}$ = −9.866E−04, $A_{14}$ = 6.041E−04, $A_{16}$ = 4.871E−04

Fourth Surface k = 0.000, $A_4$ = −1.742E−02, $A_6$ = 3.662E−02, $A_8$ = −2.816E−03, $A_{10}$ = −2.223E−03, $A_{12}$ = 1.767E−03, $A_{14}$ = 6.276E−04, $A_{16}$ = 1.073E−04

Fifth Surface k = 0.000, $A_4$ = −4.626E−02, $A_6$ = 6.154E−03, $A_8$ = 4.691E−03, $A_{10}$ = 2.075E−03, $A_{12}$ = 5.021E−04, $A_{14}$ = −1.188E−04, $A_{16}$ = −2.322E−05

Sixth Surface k = 0.000, $A_4$ = −4.184E−02, $A_6$ = 4.595E−03, $A_8$ = 6.699E−03, $A_{10}$ = 3.035E−04, $A_{12}$ = −7.876E−05, $A_{14}$ = 2.209E−04, $A_{16}$ = 1.587E−05

Seventh Surface k = 0.000, $A_4$ = −3.634E−03, $A_6$ = −3.239E−03, $A_8$ = 6.387E−03, $A_{10}$ = −2.848E−04, $A_{12}$ = −3.207E−03, $A_{14}$ = 1.763E−03, $A_{16}$ = −2.880E−04

Eighth Surface k = 0.000, $A_4$ = 1.463E−02, $A_6$ = 7.468E−03, $A_8$ = −1.421E−03, $A_{10}$ = −3.737E−03, $A_{12}$ = 2.610E−03, $A_{14}$ = −6.962E−04, $A_{16}$ = 6.206E−05

Ninth Surface k = 0.000, $A_4$ = −1.642E−02, $A_6$ = −2.897E−03, $A_8$ = −2.927E−03, $A_{10}$ = −1.681E−04, $A_{12}$ = 7.413E−04, $A_{14}$ = −2.229E−04, $A_{16}$ = 2.081E−05

Unit: mm

Tenth Surface k = 0.000, $A_4$ = −2.260E−02, $A_6$ = −1.110E−03, $A_8$ = −2.878E−05, $A_{10}$ = 1.538E−05, $A_{12}$ = 1.588E−05, $A_{14}$ = 2.340E−06, $A_{16}$ = −6.326E−07

Eleventh Surface k = 0.000, $A_4$ = −2.844E−02, $A_6$ = 1.759E−03, $A_8$ = 1.481E−04, $A_{10}$ = 1.121E−05, $A_{12}$ = 1.397E−06, $A_{14}$ = 2.517E−07, $A_{16}$ = −1.012E−07

Twelfth Surface k = 0.000, $A_4$ = −6.661E−03, $A_6$ = −6.014E−04, $A_8$ = −6.966E−06, $A_{10}$ = 3.555E−06, $A_{12}$ = −6.631E−08, $A_{14}$ = −1.040E−07, $A_{16}$ = 1.185E−08

Thirteenth Surface k = 0.000, $A_4$ = −3.493E−02, $A_6$ = 8.293E−03, $A_8$ = −1.304E−03, $A_{10}$ = 1.039E−04, $A_{12}$ = −1.200E−05, $A_{14}$ = 1.657E−06, $A_{16}$ = −7.841E−08

Fourteenth Surface k = 0.000, $A_4$ = −4.589E−02, $A_6$ = 8.687E−03, $A_8$ = −1.777E−03, $A_{10}$ = 2.358E−04, $A_{12}$ = −2.035E−05, $A_{14}$ = 9.675E−07, $A_{16}$ = −1.964E−08 f1 = 4.01 mm
f2 = −13.19 mm
f3 = −38.11 mm
f4 = 13.72 mm
f5 = −25.55 mm
f6 = −23.18 mm
f7 = −13.29 mm
f23 = −9.70 mm
f45 = 27.98 mm
f67 = −8.13 mm

The values of the respective conditional expressions are as follows:

f23/f1 = −2.42
f2/f3 = 0.35
f1/f = 0.72
f45/f67 = −3.44
f67/f = −1.46
f4/f = 2.46
f7/f = −2.38
D23/f = 0.076
D34/f = 0.037

Accordingly, the imaging lens of Numerical Data Example 5 satisfies the above-described conditional expressions. A distance on the optical axis from the object-side surface of the first lens L1 to the image plane IM (air conversion length for the filter 10) is 6.47 mm, and downsizing of the imaging lens is attained.

Figure 14:
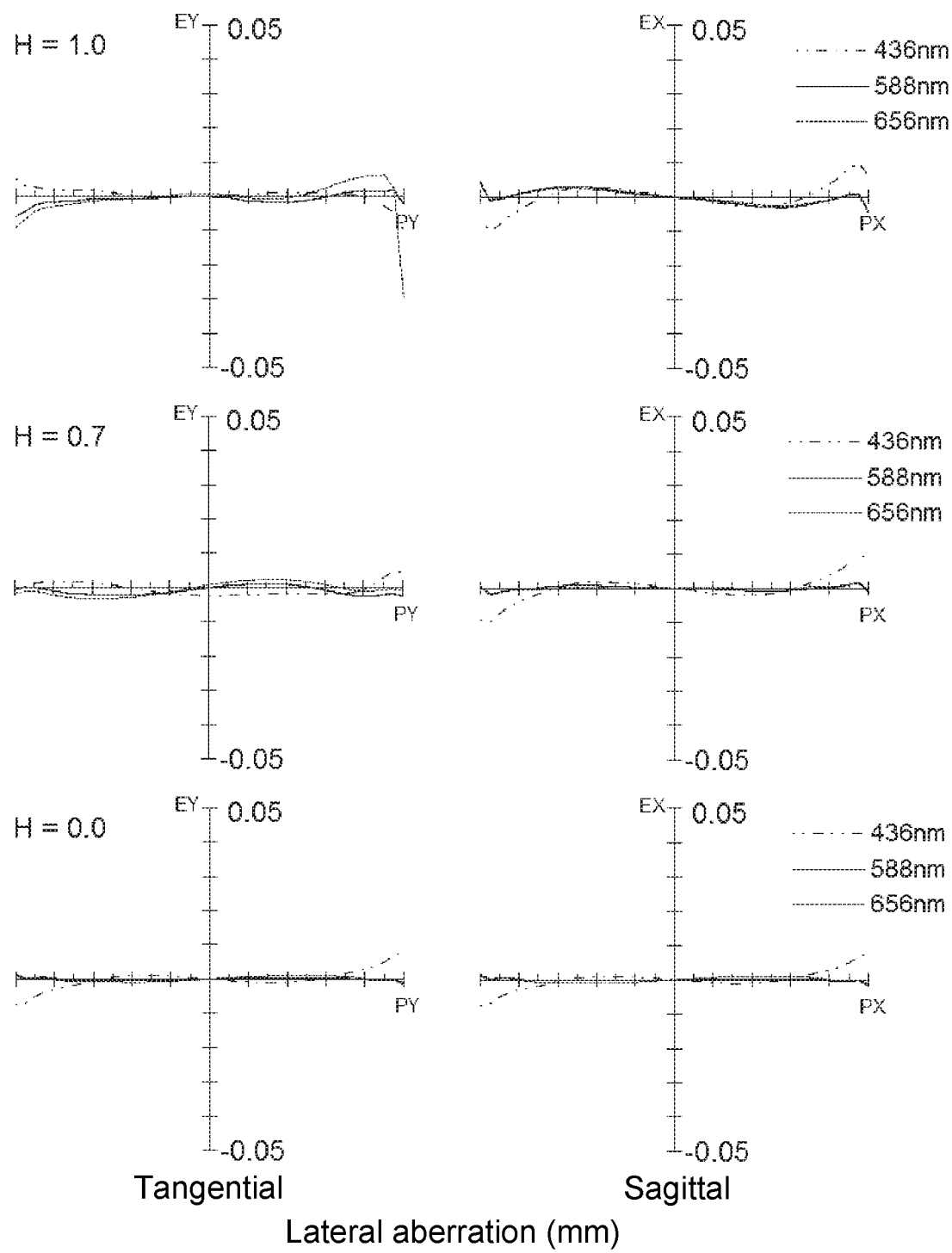
FIG. 14 is an aberration diagram showing a lateral aberration of the imaging lens of FIG. 13.
Figure 15:
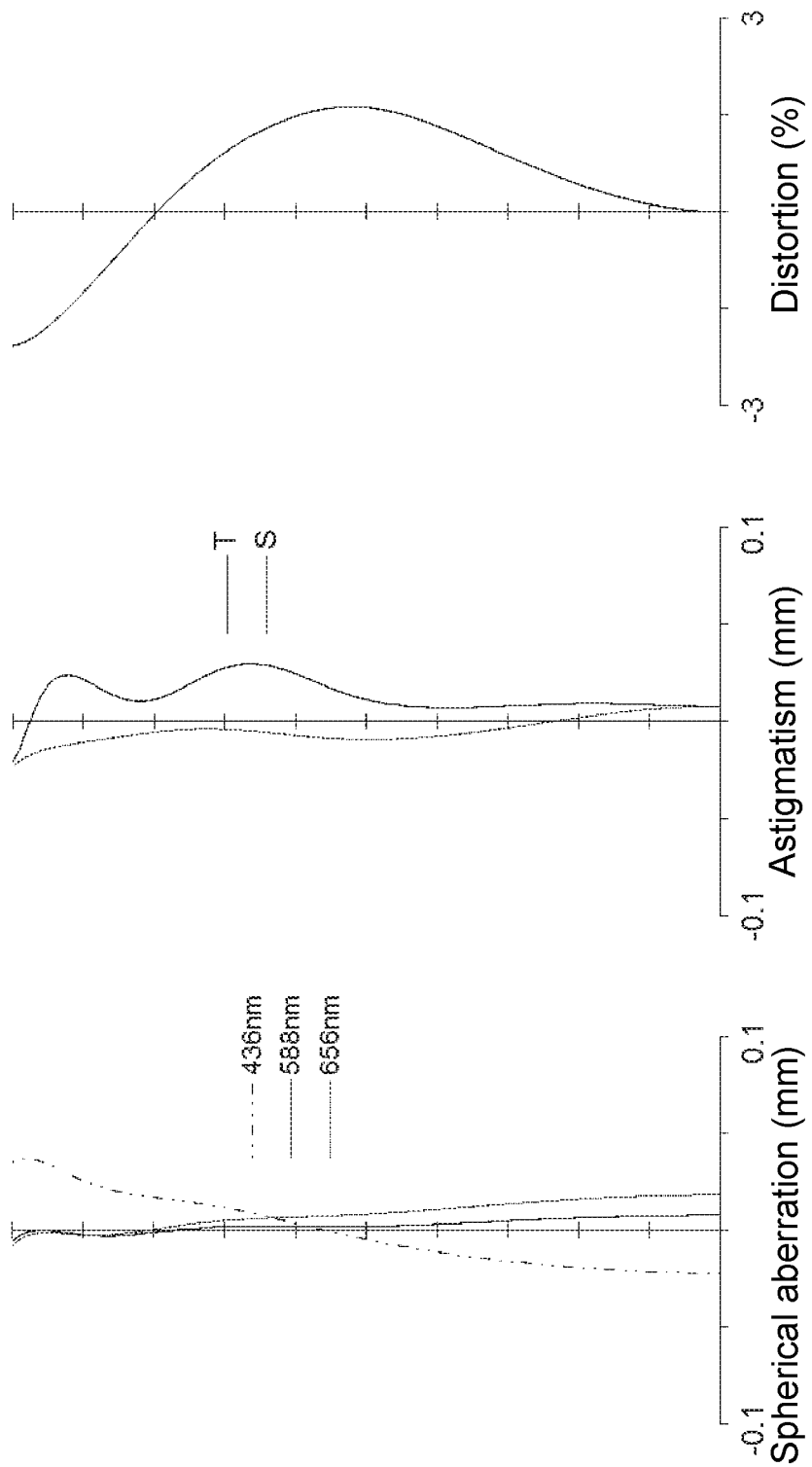
FIG. 15 is an aberration diagram showing a spherical aberration, astigmatism, and a distortion of the imaging lens of FIG. 13.
Figure 16:
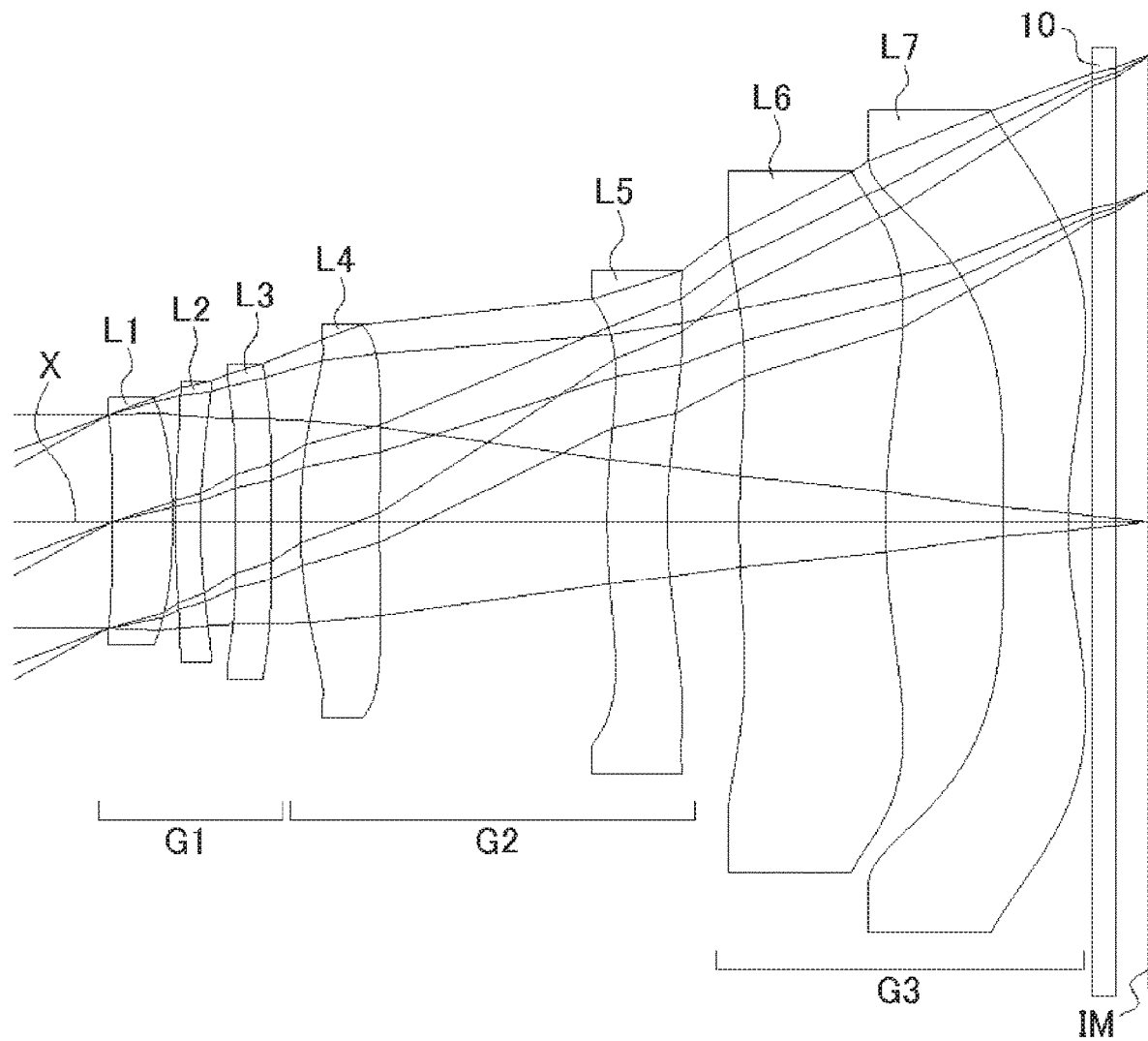
FIG. 16 shows a sectional view of a schematic configuration of an imaging lens in Numerical Data Example 6 according to the embodiment of the invention.

FIG. 14 shows the lateral aberration of the imaging lens in Numerical Data Example 5, which corresponds to the image height ratio H of the imaging lens. FIG. 15 shows a spherical aberration (mm), astigmatism (mm), and a distortion (%), respectively. As shown in FIGS. 14 and 15, according to the imaging lens of Numerical Data Example 5, the aberrations are satisfactorily corrected.

Numerical Data Example 6

Basic data are shown below.

f=7.33 mm, Fno=4.1, ω=28.6°

Unit: mm

Surface Data

| Surface Number i | r | d | nd | vd |
|---|---|---|---|---|
| (Object) | ∞ | ∞ | | |
| 1* (Stop) | −44.829 | 0.512 | 1.5346 | 56.1 (=vd1) |
| 2* | −6.136 | 0.020 | | |
| 3* | 5.874 | 0.214 | 1.6355 | 24.0 (=vd2) |
| 4* | 4.901 | 0.293 (=D23) | | |
| 5* | 37.489 | 0.298 | 1.6355 | 24.0 (=vd3) |
| 6* | 23.846 | 0.256 (=D34) | | |
| 7* | 4.515 | 0.669 | 1.5346 | 56.1 (=vd4) |
| 8* | 41.011 | 1.923 | | |
| 9* | 5.751 | 0.510 | 1.6355 | 24.0 (=vd5) |
| 10* | 5.095 | 0.607 | | |
| 11* | 8.203 | 1.236 | 1.5346 | 56.1 (=vd6) |
| 12* | 5.378 | 0.995 | | |
| 13* | 36.754 | 0.547 | 1.5346 | 56.1 (=vd7) |
| 14* | 3.631 | 0.200 | | |
| 15 | ∞ | 0.200 | 1.5168 | 64.2 |
| 16 | ∞ | 0.282 | | |
| (Image plane) | ∞ | | | |

Aspheric Surface Data

First Surface k = 0.000, $A_4$ = −1.873E−02, $A_6$ = −1.109E−02, $A_8$ = −4.570E−03, $A_{10}$ = 5.137E−04, $A_{12}$ = 3.727E−03, $A_{14}$ = 1.298E−03, $A_{16}$ = −1.706E−03

Second Surface k = 0.000, $A_4$ = −8.151E−02, $A_6$ = 2.883E−02, $A_8$ = −4.255E−03, $A_{10}$ = −2.454E−03, $A_{12}$ = −6.209E−04, $A_{14}$ = 1.801E−04, $A_{16}$ = 1.428E−03

Third Surface k = 0.000, $A_4$ = −7.671E−02, $A_6$ = 4.679E−02, $A_8$ = −1.249E−02, $A_{10}$ = −3.500E−03, $A_{12}$ = 9.848E−04, $A_{14}$ = 8.817E−04, $A_{16}$ = −2.798E−04

Fourth Surface k = 0.000, $A_4$ = −4.097E−02, $A_6$ = 2.460E−02, $A_8$ = −6.438E−03, $A_{10}$ = −3.589E−03, $A_{12}$ = 2.222E−04, $A_{14}$ = −1.119E−04, $A_{16}$ = 2.542E−04

Fifth Surface k = 0.000, $A_4$ = −6.469E−02, $A_6$ = 1.564E−02, $A_8$ = 2.618E−03, $A_{10}$ = −8.544E−04, $A_{12}$ = −7.128E−04, $A_{14}$ = −6.448E−05, $A_{16}$ = 2.675E−04

Sixth Surface k = 0.000, $A_4$ = −4.461E−02, $A_6$ = 6.629E−04, $A_8$ = 3.310E−03, $A_{10}$ = 3.010E−04, $A_{12}$ = −2.561E−04, $A_{14}$ = 4.397E−05, $A_{16}$ = −1.793E−07

Seventh Surface k = 0.000, $A_4$ = 5.814E−03, $A_6$ = −1.035E−02, $A_8$ = 4.677E−03, $A_{10}$ = −1.371E−04, $A_{12}$ = −2.909E−03, $A_{14}$ = 1.885E−03, $A_{16}$ = −4.024E−04

Eighth Surface k = 0.000, $A_4$ = −7.255E−03, $A_6$ = 1.787E−03, $A_8$ = −8.541E−04, $A_{10}$ = −3.526E−03, $A_{12}$ = 2.579E−03, $A_{14}$ = −7.317E−04, $A_{16}$ = 5.890E−05

Ninth Surface k = 0.000, $A_4$ = −2.248E−02, $A_6$ = 5.783E−04, $A_8$ = −2.280E−03, $A_{10}$ = −4.753E−03, $A_{12}$ = 7.297E−04, $A_{14}$ = −2.310E−04, $A_{16}$ = 2.496E−05

Unit: mm

Tenth Surface k = 0.000, $A_4$ = −1.820E−02, $A_6$ = −1.371E−03, $A_8$ = −3.740E−06, $A_{10}$ = 2.744E−05, $A_{12}$ = 1.287E−05, $A_{14}$ = 2.924E−06, $A_{16}$ = −6.523E−07

Eleventh Surface k = 0.000, $A_4$ = −2.330E−02, $A_6$ = 9.404E−04, $A_8$ = 1.272E−04, $A_{10}$ = 1.381E−06, $A_{12}$ = 8.022E−07, $A_{14}$ = 2.478E−07, $A_{16}$ = −7.384E−08

Twelfth Surface k = 0.000, $A_4$ = −1.368E−02, $A_6$ = −5.267E−04, $A_8$ = 2.149E−05, $A_{10}$ = 6.717E−06, $A_{12}$ = −9.850E−07, $A_{14}$ = −1.166E−07, $A_{16}$ = 1.921E−08

Thirteenth Surface k = 0.000, $A_4$ = −4.044E−02, $A_6$ = 8.363E−03, $A_8$ = −1.297E−03, $A_{10}$ = 1.043E−04, $A_{12}$ = −1.196E−05, $A_{14}$ = 1.664E−06, $A_{16}$ = −7.712E−08

Fourteenth Surface k = 0.000, $A_4$ = −4.735E−02, $A_6$ = 8.446E−03, $A_8$ = −1.735E−03, $A_{10}$ = 2.391E−04, $A_{12}$ = −2.016E−05, $A_{14}$ = 9.641E−07, $A_{16}$ = −2.056E−08 f1 = 13.24 mm
f2 = −50.93 mm
f3 = −103.98 mm
f4 = 9.43 mm
f5 = −100.75 mm
f6 = −34.46 mm
f7 = −7.58 mm
f23 = −34.17 mm
f45 = 9.73 mm
f67 = −6.28 mm

The values of the respective conditional expressions are as follows:

f23/f1 = −2.58
f2/f3 = 0.49
f1/f = 1.81
f45/f67 = −1.55
f67/f = −0.86
f4/f = 1.29
f7/f = −1.03
D23/f = 0.040
D34/f = 0.035

Accordingly, the imaging lens of Numerical Data Example 6 satisfies the above-described conditional expressions. A distance on the optical axis from the object-side surface of the first lens L1 to the image plane IM (air conversion length for the filter 10) is 8.69 mm, and downsizing of the imaging lens is attained.

Figure 17:
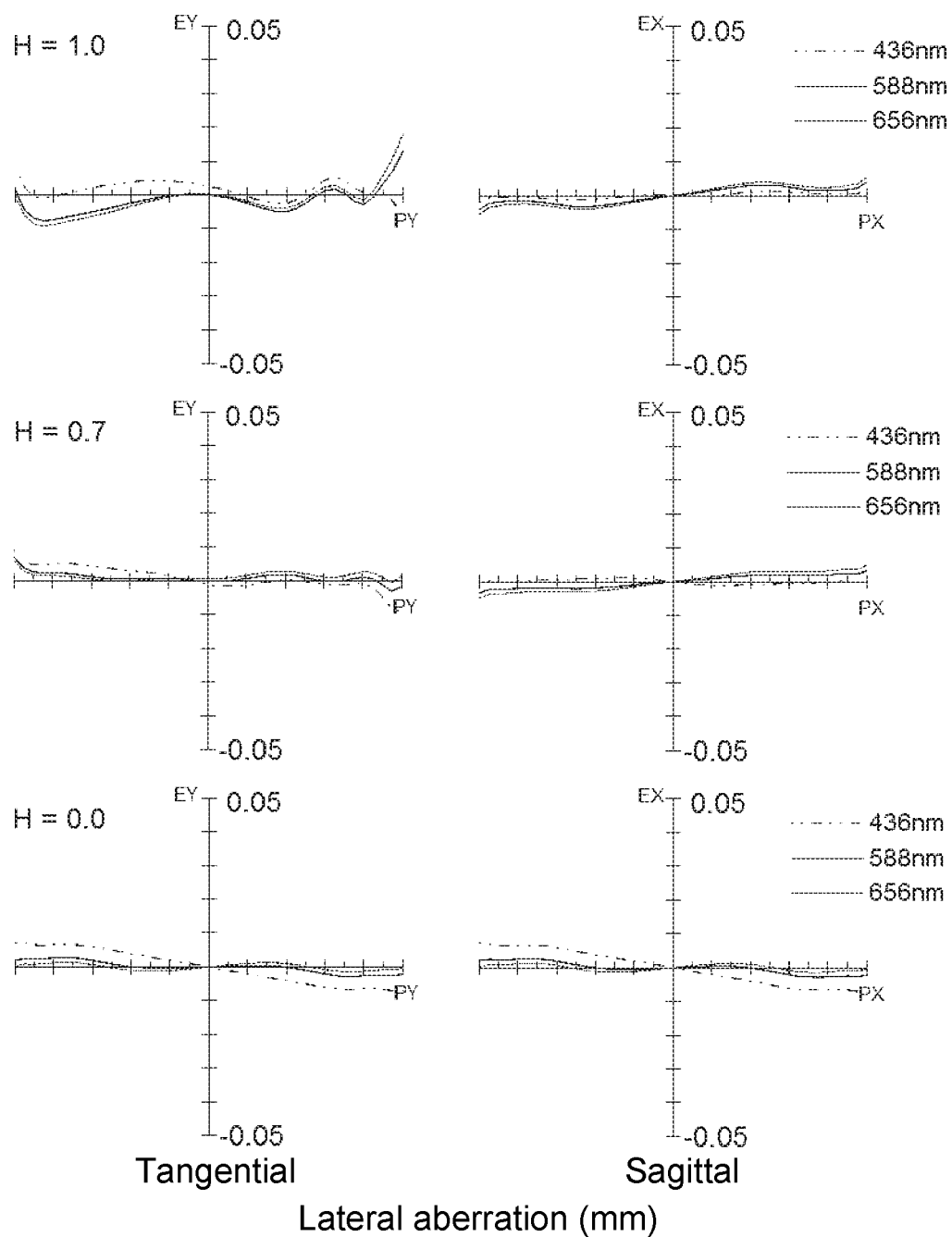
FIG. 17 is an aberration diagram showing a lateral aberration of the imaging lens of FIG. 16.
Figure 18:
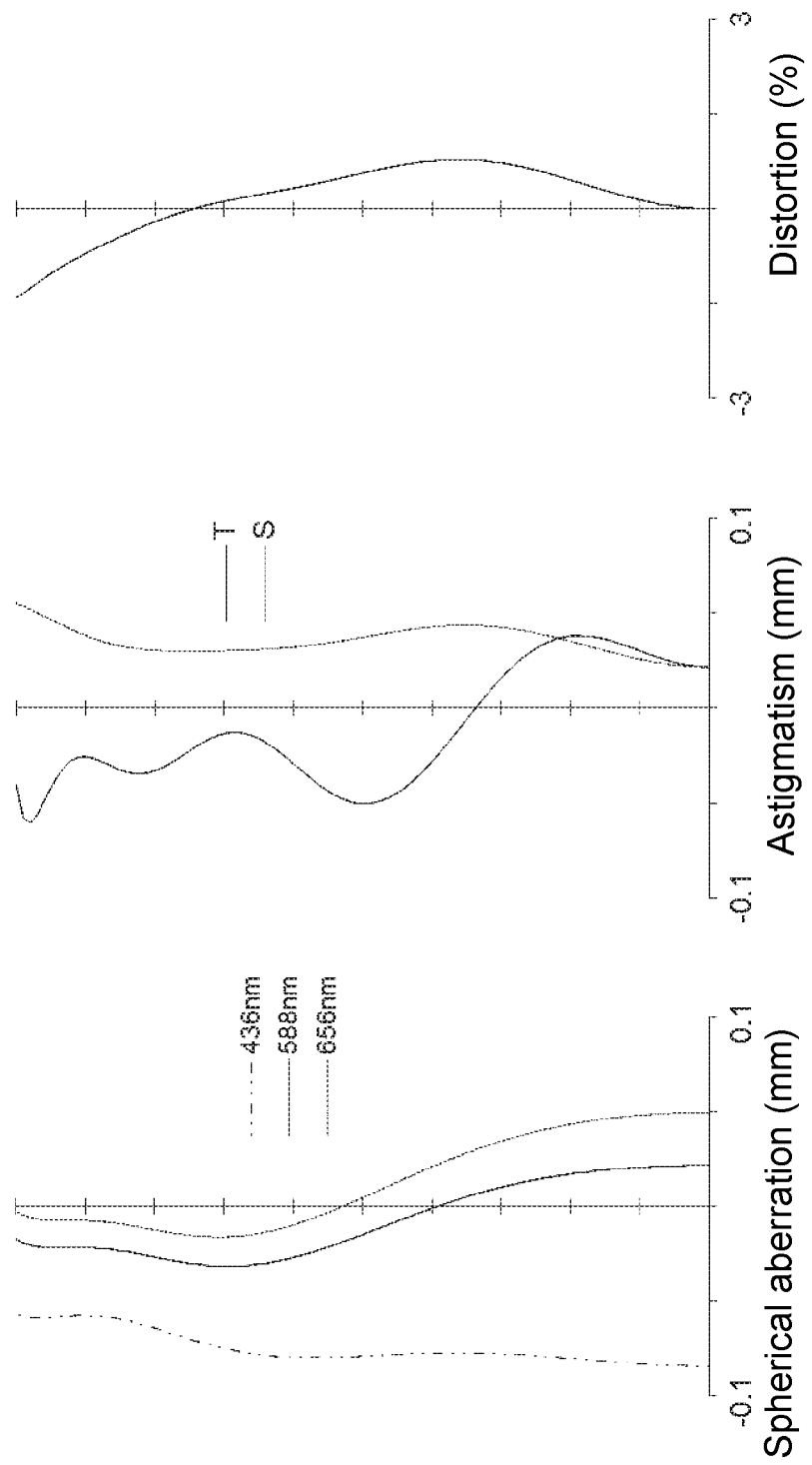
FIG. 18 is an aberration diagram showing a spherical aberration, astigmatism, and a distortion of the imaging lens of FIG. 16.

FIG. 17 shows the lateral aberration of the imaging lens in Numerical Data Example 6, which corresponds to the image height ratio H of the imaging lens. FIG. 18 shows a spherical aberration (mm), astigmatism (mm), and a distortion (%), respectively. As shown in FIGS. 17 and 18, according to the imaging lens of Numerical Data Example 6, the aberrations are satisfactorily corrected.

According to the imaging lens of the embodiment described above, it is achievable to obtain a wide angle of view (2ω) that is 70° or greater. Here, the imaging lenses of Numerical Data Examples 1 to 6 have angles of view, which are as wide as 57.2° to 72.6°. According to the imaging lens of the embodiment, it is achievable to take an image of a wider range than the range that can be taken by a conventional imaging lens.

Furthermore, with advancement in digital zooming technology for enlarging any range of an image obtained through an imaging lens by image processing, a high-pixel count imaging element has been often used in combination with a high-resolution imaging lens. In case of those high-pixel count imaging lens, a light-receiving area of each pixel decreases, so that an image taken by the imaging lens tends to be dark. As a method to solve this problem, there is a method of improving a light-receiving sensitivity of an imaging element using an electrical circuit. However, when a light-receiving sensitivity increases, a noise component that does not contribute to image formation directly is also amplified. Therefore, it is necessary to have another circuit to reduce noises. According to the imaging lenses of the embodiment, Fno is as small as 2.2 to 3.0. According to the imaging lenses of the embodiment, it is achievable to obtain sufficiently bright images without additional electrical circuit as described above.

Therefore, when the imaging lens of the embodiment is applied in an imaging optical system including a camera for mounting in a portable device such as cellular phones, portable information terminals, and smartphones, a digital still camera, a security camera, an onboard camera, and network camera, it is possible to attain both high functionality of the cameras and downsizing.

The invention is applicable to an imaging lens for mounting in a relatively small-sized camera, including a camera to be equipped in a portable device such as cellular phones and portable information terminals, a digital still camera, a security camera, a vehicle onboard camera, and a network camera.

The disclosure of Japanese Patent Application No. 2014-057414, filed on Mar. 20, 2014, is incorporated in the application by reference.

While the invention has been explained with reference to the specific embodiments of the invention, the explanation is illustrative and the invention is limited only by the appended claims.

What is claimed is:

1. An imaging lens comprising:
    a stop;
    a first lens having positive refractive power;
    a second lens having negative refractive power;
    a third lens;
    a fourth lens having positive refractive power;
    a fifth lens;
    a sixth lens; and
    a seventh lens, arranged in this order from an object side to an image plane side,
    wherein said first lens is formed in a meniscus shape near an optical axis thereof,
    said third lens is formed in a shape so that a surface thereof directing to the image plane side is concave near an optical axis thereof, and
    said sixth lens is formed in a meniscus shape near an optical axis thereof.

2. The imaging lens according to claim 1, wherein said first lens has a focal length f1 so that the following conditional expression is satisfied:

$$0.5 < f1/f < 2.0,$$

where f is a focal length of a whole lens system.

3. The imaging lens according to claim 1, wherein said second lens has a focal length f2 and said third lens has a focal length f3 so that the following conditional expression is satisfied:

$$0.1 < f2/f3 < 0.6.$$

4. The imaging lens according to claim 1, wherein said fourth lens has a focal length f4 so that the following conditional expression is satisfied:

$$1.0 < f4/f < 3.0,$$

where f is a focal length of a whole lens system.

5. The imaging lens according to claim 1, wherein said seventh lens has a focal length f7 so that the following conditional expression is satisfied:

$$-4.0 < f7/f < -0.8,$$

where f is a focal length of a whole lens system.

6. The imaging lens according to claim 1, wherein said sixth lens and said seventh lens have a composite focal length f67 so that the following conditional expression is satisfied:

$$-1.7 < f67/f < -0.5,$$

where f is a focal length of a whole lens system.

7. The imaging lens according to claim 1, wherein said second lens is disposed away from the third lens by a distance D23 on an optical axis thereof so that the following conditional expression is satisfied:

$$0.03 < D23/f < 0.2,$$

where f is a focal length of a whole lens system.

8. An imaging lens comprising:
    a first lens group;
    a second lens group; and
    a third lens group having negative refractive power, arranged in this order from an object side to an image plane side,
    wherein said first lens group includes a first lens, a second lens, and a third lens,
    said second lens group includes a fourth lens and a fifth lens,
    said third lens group includes a sixth lens and a seventh lens,
    wherein said fifth lens is formed in a meniscus shape near an optical axis thereof,
    said seventh lens is formed in a meniscus shape near an optical axis thereof, and
    said third lens has an Abbe's number vd3 so that the following conditional expression is satisfied:

$$vd3 < 35.$$

9. The imaging lens according to claim 8, wherein said first lens has a focal length f1 so that the following conditional expression is satisfied:

$$0.5 < f1/f < 2.0,$$

where f is a focal length of a whole lens system.

10. The imaging lens according to claim 8, wherein said second lens has a focal length f2 and said third lens has a focal length f3 so that the following conditional expression is satisfied:

$$0.1 < f2/f3 < 0.6.$$

11. The imaging lens according to claim 8, wherein said fourth lens has a focal length f4 so that the following conditional expression is satisfied:

$$1.0 < f4/f < 3.0,$$

where f is a focal length of a whole lens system.

12. The imaging lens according to claim 8, wherein said seventh lens has a focal length f7 so that the following conditional expression is satisfied:

$$-4.0 < f7/f < -0.8,$$

where f is a focal length of a whole lens system.

13. The imaging lens according to claim 8, wherein said sixth lens and said seventh lens have a composite focal length f67 so that the following conditional expression is satisfied:

$-1.7<f67/f<-0.5$, where f is a focal length of a whole lens system.

14. The imaging lens according to claim 8, wherein said second lens is disposed away from the third lens by a distance D23 on an optical axis thereof so that the following conditional expression is satisfied:

$0.03<D23/f<0.2$, where f is a focal length of a whole lens system.

15. An imaging lens comprising:
a first lens group;
a second lens group; and
a third lens group having negative refractive power, arranged in this order from an object side to an image plane side,
wherein said first lens group includes a first lens, a second lens, and a third lens,
said second lens group includes a fourth lens and a fifth lens,
said third lens group includes a sixth lens and a seventh lens,
said seventh lens is formed in a meniscus shape near an optical axis thereof,
said seventh lens is formed in a shape so that a surface thereof on the image plane side is aspheric, and
said third lens has an Abbe's number vd3 so that the following conditional expression is satisfied:

$vd3<35$.

16. The imaging lens according to claim 15, wherein said second lens has a focal length f2 and said third lens has a focal length f3 so that the following conditional expression is satisfied:

$0.1<f2/f3<0.6$.

17. The imaging lens according to claim 15, wherein said fourth lens has a focal length f4 so that the following conditional expression is satisfied:

$1.0<f4/f<3.0$, where f is a focal length of a whole lens system.

18. The imaging lens according to claim 15, wherein said seventh lens has a focal length f7 so that the following conditional expression is satisfied:

$-4.0<f7/f<-0.8$, where f is a focal length of a whole lens system.

19. The imaging lens according to claim 15, wherein said sixth lens and said seventh lens have a composite focal length f67 so that the following conditional expression is satisfied:

$-1.7<f67/f<-0.5$, where f is a focal length of a whole lens system.

20. The imaging lens according to claim 15, wherein said second lens is disposed away from the third lens by a distance D23 on an optical axis thereof so that the following conditional expression is satisfied:

$0.03<D23/f<0.2$, where f is a focal length of a whole lens system.

* * * * *